United States Patent
Maruyama

(10) Patent No.: US 9,287,056 B2
(45) Date of Patent: Mar. 15, 2016

(54) ELECTROLYTE FOR PHOTOELECTRIC CONVERSION ELEMENT, PHOTOELECTRIC CONVERSION ELEMENT USING THE ELECTROLYTE, AND DYE-SENSITIZED SOLAR CELL USING THE ELECTROLYTE

(75) Inventor: Tsukasa Maruyama, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 225 days.

(21) Appl. No.: 13/818,334

(22) PCT Filed: Aug. 25, 2011

(86) PCT No.: PCT/JP2011/069206
§ 371 (c)(1),
(2), (4) Date: Feb. 22, 2013

(87) PCT Pub. No.: WO2012/026538
PCT Pub. Date: Mar. 1, 2012

(65) Prior Publication Data
US 2013/0146143 A1    Jun. 13, 2013

(30) Foreign Application Priority Data

Aug. 25, 2010 (JP) ................. 2010-188515
Oct. 29, 2010 (JP) ................. 2010-243864

(51) Int. Cl.
*H01M 14/00* (2006.01)
*H01B 1/06* (2006.01)
*H01L 31/04* (2014.01)
*H01G 9/20* (2006.01)
*H01B 1/12* (2006.01)

(52) U.S. Cl.
CPC ............ *H01G 9/2004* (2013.01); *H01B 1/122* (2013.01); *H01G 9/2013* (2013.01); *H01G 9/2031* (2013.01); *H01G 9/2059* (2013.01); *Y02E 10/542* (2013.01)

(58) Field of Classification Search
CPC ... H01G 9/2004; H01G 9/2013; H01G 9/035; H01B 1/122; H01M 2300/0085
USPC ........... 252/62.2; 136/263, 261; 429/302, 188
See application file for complete search history.

(56) References Cited

U.S. PATENT DOCUMENTS

| | | | |
|---|---|---|---|
| 7,351,359 B2 | 4/2008 | Maruyama et al. | |
| 7,497,975 B2 | 3/2009 | Maruyama et al. | |
| 7,875,209 B2 | 1/2011 | Maruyama et al. | |
| 8,957,305 B2 * | 2/2015 | Maruyama | 136/252 |
| 2007/0275546 A1 | 11/2007 | Maruyama et al. | |

FOREIGN PATENT DOCUMENTS

| | | | |
|---|---|---|---|
| JP | 2007-188809 | * | 7/2007 |
| JP | 2007-188809 A | | 7/2007 |
| JP | 2007-531206 A | | 11/2007 |
| WO | WO 2005/096392 | * | 10/2005 |
| WO | WO 2008/020643 | * | 2/2008 |

* cited by examiner

*Primary Examiner* — Carol M Koslow
(74) *Attorney, Agent, or Firm* — Carrier Blackman & Associates, P.C.; Joseph P. Carrier; Anne G. Sabourin

(57) ABSTRACT

An object of the present invention is to provide an electrolyte for a photoelectric conversion element that can achieve superior moisture resistance. The electrolyte for a photoelectric conversion element of the present invention is an electrolyte for a photoelectric conversion element which contains an organic salt compound (A) and a lamellar clay mineral (B), wherein the above-mentioned organic salt compound (A) contains more than 50 mass %, in terms of cationic weight, of an organic salt compound (a1) having a specific cation.

6 Claims, 1 Drawing Sheet

ELECTROLYTE FOR PHOTOELECTRIC CONVERSION ELEMENT, PHOTOELECTRIC CONVERSION ELEMENT USING THE ELECTROLYTE, AND DYE-SENSITIZED SOLAR CELL USING THE ELECTROLYTE

TECHNICAL FIELD

The present invention relates to an electrolyte for a photoelectric conversion element, a photoelectric conversion element using the electrolyte, and a dye-sensitized solar cell using the electrolyte.

BACKGROUND OF THE INVENTION

In recent years, environmental issues such as global warming and the like that are attributed to increases in carbon dioxide have become serious. As a result, non-silicon solar cells have gained attention as solar cells that have little environmental impact and that also allow for reduced manufacturing costs; and research and development of such is moving forward.

Among non-silicon solar cells, the dye-sensitized solar cell developed by Graetzel et al. in Switzerland has attracted attention as a new type of solar cell. As a solar cell using organic materials, these solar cells have advantages such as high photoelectric conversion efficiency and lower manufacturing costs than silicon solar cells.

However, dye-sensitized solar cells are electrochemical cells, and therefore use organic electrolytic solutions and/or ionic liquids as electrolytes. In cases where organic electrolytic solutions are used, there is a problem in that electrical efficiency decreases due to volatilization and depletion during long-term use. Additionally, in cases where ionic liquids are used, while volatilization and depletion that occur during long-term use can be prevented, there are durability problems such as structural degradation caused by liquid leakage.

Therefore, research is being conducted regarding converting the electrolyte from a liquid to a gel or solid for the purpose of preventing the volatilization and liquid leakage of the electrolytic solution and ensuring the long-term stability and durability of the solar cell.

For example, Patent Document 1 describes an electrolyte for a photoelectric conversion element comprising (i) a lamellar clay mineral and/or an organically modified lamellar clay mineral and (ii) an ionic liquid (claim 1).

PRIOR ART DOCUMENTS

Patent Documents

Patent Document 1: Japanese Unexamined Patent Application Publication (translation of PCT application) No. 2007-531206

SUMMARY OF THE INVENTION

Problem to be Solved by the Invention

The present inventors discovered, as a result of investigating the photoelectric conversion element using the electrolyte for a photoelectric conversion element described in Patent Document 1, that when allowed to sit at rest at about 85% RH (relative humidity) for about 200 hours or longer, there are cases where the photoelectric conversion efficiency declines. This is thought to be due to the electrolyte or sensitizing dye being altered by moisture or humidity that has entered the photoelectric conversion element.

Therefore, an object of the present invention is to provide an electrolyte for a photoelectric conversion element that can achieve superior moisture resistance.

Means to Solve the Problem

As a result of diligent research into how to solve the above-mentioned problem, the inventors of the present invention found that by using an electrolyte containing a specific quantity of an organic salt compound containing a hydrocarbon group having a specific number of carbon atoms, the moisture resistance of the obtained photoelectric conversion element was excellent, and thereby completed the present invention.

Specifically, the present invention provides the following (i) to (viii).

(i) An electrolyte for a photoelectric conversion element, which contains an organic salt compound (A) having a cation represented by formula (1) or (2) below and a lamellar clay mineral (B), wherein the above-mentioned organic salt compound (A) contains more than 50 mass %, in terms of cationic weight, of organic salt compound (a1), the above-mentioned organic salt compound (a1) is a compound in which at least one of $R^2$, $R^3$, and an optional substituent group on $R^1$ in formula (1) below is a hydrocarbon group having from 5 to 20 carbon atoms and optionally having a hetero atom, or a compound in which at least one of $R^4$, $R^5$, $R^6$ and $R^7$ in formula (2) below is a hydrocarbon group having from 5 to 20 carbon atoms and optionally having a hetero atom.

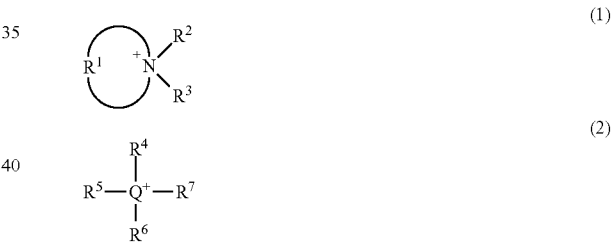

In formula (1), $R^1$ is a hydrocarbon group having from 1 to 20 carbon atoms that may contain a hetero atom, and may include a substituent having from 1 to 20 carbon atoms that may contain a hetero atom. $R^2$ and $R^3$ are each independently a hydrogen atom or a hydrocarbon group having from 1 to 20 carbon atoms and optionally having a hetero atom. However, the $R^3$ moiety is absent if the nitrogen atom contains a double bond.

In formula (2), Q is a nitrogen atom, an oxygen atom, a phosphorus atom or a sulfur atom, and $R^4$, $R^5$, $R^6$ and $R^7$ are each independently a hydrogen atom or a hydrocarbon group having from 1 to 20 carbon atoms and optionally having a hetero atom. However, the $R^7$ moiety is absent if Q is an oxygen atom or a sulfur atom and, if Q is a sulfur atom, $R^4$ and $R^5$ may be linked.

(ii) The electrolyte for a photoelectric conversion element according to (i) above, wherein a content of the above-mentioned organic salt compound (a1) in the above-mentioned organic salt compound (A) is 90 mass % or less in terms of cationic weight.

(iii) The electrolyte for a photoelectric conversion element according to (i) or (ii) above, wherein the above-mentioned organic salt compound (A) contains a thiocyanate anion.

(iv) The electrolyte for a photoelectric conversion element according to any one of (i) to (iii) above, wherein the above-mentioned organic salt compound (A) contains an organic salt compound (a2). The above-mentioned organic salt compound (a2) is a compound in which the hydrocarbon groups represented by $R^2$ and $R^3$ in formula (1) above are hydrocarbon groups having from 1 to 4 carbon atoms and optionally having a hetero atom, or a compound in which the hydrocarbon groups represented by $R^4$, $R^5$, $R^6$ and $R^7$ in formula (2) above are hydrocarbon groups having from 1 to 4 carbon atoms and optionally having a hetero atom.

(v) The electrolyte for a photoelectric conversion element according to any one of (i) to (iv) above, wherein the above-mentioned lamellar clay mineral (B) has an alkylsilyl group.

(vi) The electrolyte for a photoelectric conversion element according to any one of (i) to (v) above, which further contains an organic solvent (C) having a boiling point of 150° C. or higher and a relative dielectric constant of 20 or higher.

(vii) A photoelectric conversion element comprising: a photoelectrode including a transparent conductive film and a metal oxide semiconductor porous film; a counterelectrode disposed opposite the above-mentioned photoelectrode; and an electrolyte layer disposed between the above-mentioned photoelectrode and the above-mentioned counterelectrode, wherein the above-mentioned electrolyte layer is an electrolyte for a photoelectric conversion element described in any of (i) to (vi) above.

(viii) A dye-sensitized solar cell including the photoelectrode described in (vii) above carrying a photosensitized dye.

Effect of the Invention

According to the present invention, it is possible to provide an electrolyte for a photoelectric conversion element that can achieve excellent moisture resistance.

BRIEF DESCRIPTION OF THE DRAWINGS

FIG. 2 is a drawing illustrating a basic configuration of a dye-sensitized solar cell of the present invention used in the Working Examples and the like.

BEST MODE FOR CARRYING OUT THE INVENTION

<Electrolyte for a Photoelectric Conversion Element>

Figure 1:
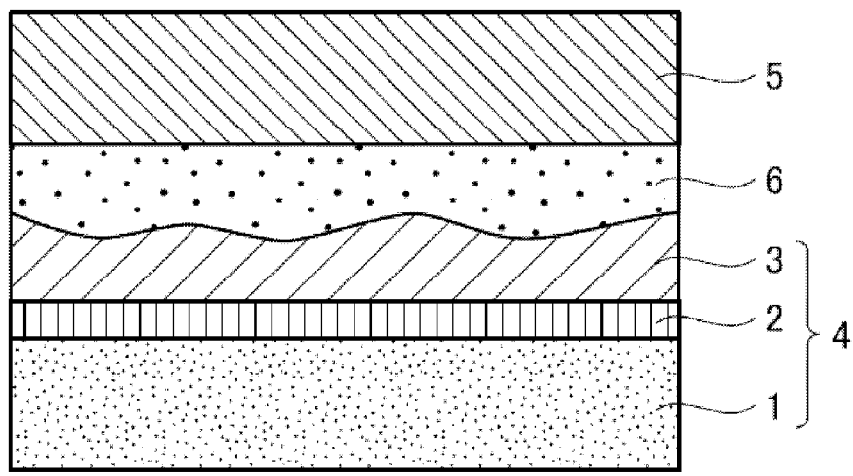
FIG. 1 is a schematic cross-sectional view illustrating an example of a basic configuration of a photoelectric conversion element of the present invention.

The electrolyte for a photoelectric conversion element of the present invention (hereinafter also referred to as "the electrolyte of the present invention") contains an organic salt compound (A) having a cation represented by formula (1) or (2) above and a lamellar clay mineral (B), wherein the above-mentioned organic salt compound (A) contains more than 50 mass %, in terms of cationic weight, of an organic salt compound (a1), the above-mentioned organic salt compound (a1) is a compound in which at least one of $R^2$, $R^3$ and an optional substituent group on $R^4$ in formula (1) above is a hydrocarbon group having from 5 to 20 carbon atoms and optionally having a hetero atom, or a compound in which at least one of $R^4$, $R^5$, $R^6$ and $R^7$ in formula (2) above is a hydrocarbon group having from 5 to 20 carbon atoms and optionally having a hetero atom.

The electrolyte of the present invention preferably further includes an organic solvent (C) having a boiling point of not less than 150° C. and a relative dielectric constant of not less than 20 because the moisture resistance of a photoelectric conversion element using the electrolyte of the present invention (hereinafter also referred to as "the photoelectric conversion element of the present invention") will be better.

First, the components of the electrolyte of the present invention will be explained in detail.

<Organic Salt Compound (A)>

The organic salt compound (A) used in the electrolyte of the present invention is an organic salt compound having a cation represented by formula (1) or formula (2) above and an anion that is a counter ion of this cation.

The hydrocarbon group in formula (1) having from 1 to 20 carbon atoms that may contain a hetero atom, $R^1$, preferably has a ring structure along with the nitrogen atom (ammonium ion) in formula (1).

Preferred examples of the substituent groups that $R^1$ in formula (1) above may possess, which have 1 to 20 carbon atoms and which may contain a hetero atom, include alkyl groups having from 1 to 20 carbon atoms (for example, a methyl group, an ethyl group, a propyl group, a butyl group, a pentyl group, a hexyl group, a heptyl group, an octyl group, an ethylhexyl group, a nonyl group, a decyl group, a dodecyl group, an undecyl group, a hexadecyl group, an octadecyl group, a cyclopropylmethyl group, a trifluoroethyl group, and the like); alkenyl groups having from 2 to 20 carbon atoms (for example, a vinyl group, an allyl group, and the like); aryl groups having from 6 to 20 carbon atoms (for example, a phenyl group, a tolyl group, a naphthyl group, and the like); aralkyl groups having from 7 to 20 carbon atoms (for example, a benzyl group, a phenylethyl group, a phenylpropyl group, and the like); alkoxy groups having from 1 to 20 carbon atoms (for example, a methoxy group, an ethoxy group, an n-propoxy group, an iso-propoxy group, an n-butoxy group, a tert-butoxy group, a sec-butoxy group, an n-pentoxy group, an n-hexoxy group, a 1,2-dimethylbutoxy group, a heptoxy group, an octoxy group, a nonynoxy group, a decyloxy group, a phenoxy group, a methylphenoxy group, an ethylphenoxy group, and the like); and alkylalkoxy groups having from 2 to 20 carbon atoms (for example, a methylene methoxy group ($—CH_2OCH_3$), an ethylene methoxy group ($—CH_2CH_2OCH_3$), an n-propylene-iso-propoxy group ($—CH_2CH_2CH_2OCH(CH_3)_2$), a methylene-t-butoxy group ($—CH_2—O—C(CH_3)_3$), a butylene methoxy group, a pentylene methoxy group, a hexylene methoxy group, a heptylene methoxy group, an octylene methoxy group, a nonylene methoxy group, a decylene methoxy group, a methylene ethoxy group, an ethylene ethoxy group, a propylene ethoxy group, a butylene ethoxy group, a pentylene ethoxy group, a hexylene ethoxy group, an ethylene ethoxy methoxy group, a cyclopropyl methoxy group, a cyclohexyl methoxy group, a methylphenoxy group, a methoxyphenoxy group, an ethoxyphenoxy group, a phenoxyphenoxy group, and the like). Additionally, $R^1$ in formula (1) may include two or more of these substituents groups.

Examples of the hydrocarbon groups represented by $R^2$ and $R^3$ in formula (1) above, which have 1 to 20 carbon atoms and which may contain a hetero atom, include alkyl groups having from 1 to 20 carbon atoms (for example, a methyl group, an ethyl group, a propyl group, a butyl group, a pentyl group, a hexyl group, a heptyl group, an octyl group, an ethylhexyl group, a nonyl group, a decyl group, a dodecyl group, an undecyl group, a hexadecyl group, an octadecyl group, a cyclopropylmethyl group, a trifluoroethyl group, and the like); alkenyl groups having from 2 to 20 carbon atoms (for example, a vinyl group, an allyl group, and the like); aryl groups having from 6 to 20 carbon atoms (for example, a phenyl group, a tolyl group, a naphthyl group, and the like);

aralkyl groups having from 7 to 20 carbon atoms (for example, a benzyl group, a phenylethyl group, a phenylpropyl group, and the like); alkoxy groups having from 1 to 20 carbon atoms (for example, a methoxy group, an ethoxy group, an n-propoxy group, an iso-propoxy group, an n-butoxy group, a tert-butoxy group, a sec-butoxy group, an n-pentoxy group, an n-hexoxy group, a 1,2-dimethylbutoxy group, a heptoxy group, an octoxy group, a nonynoxy group, a decyloxy group, a phenoxy group, a methylphenoxy group, an ethylphenoxy group, and the like); and alkylalkoxy groups having from 2 to 20 carbon atoms (for example, a methylene methoxy group ($-CH_2OCH_3$), an ethylene methoxy group ($-CH_2CH_2OCH_3$), an n-propylene-iso-propoxy group ($-CH_2CH_2CH_2OCH(CH_3)_2$), a methylene-t-butoxy group ($-CH_2-O-C(CH_3)_3$), a butylene methoxy group, a pentylene methoxy group, a hexylene methoxy group, a heptylene methoxy group, an octylene methoxy group, a nonylene methoxy group, a decylene methoxy group, a methylene ethoxy group, an ethylene ethoxy group, a propylene ethoxy group, a butylene ethoxy group, a pentylene ethoxy group, a hexylene ethoxy group, an ethylene ethoxy methoxy group, a cyclopropyl methoxy group, a cyclohexyl methoxy group, a methylphenoxy group, a methoxyphenoxy group, an ethoxyphenoxy group, a phenoxyphenoxy group, and the like).

Examples of the hydrocarbon groups represented by $R^4$, $R^5$, $R^6$ and $R^7$ in formula (2) above, which have 1 to 20 carbon atoms and which may contain a hetero atom, include those hydrocarbon groups, which have 1 to 20 carbon atoms and which may contain a hetero atom, represented by $R^2$ and $R^3$ in formula (1) above.

Preferred examples of the cation represented by formula (1) above include imidazolium ions, pyridinium ions, pyrrolidinium ions, piperidinium ions, and the like, and preferred examples include cations represented by formulae (3) to (6) below.

Of these, the cations expressed by the following formulae (3) and (5) are preferable because the photoelectric conversion efficiency of the photoelectric conversion element used in the electrolyte of the present invention tends to be better.

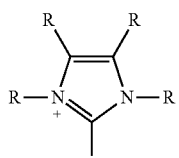
(3)

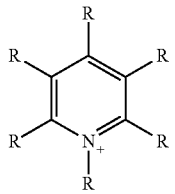
(4)

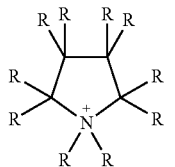
(5)

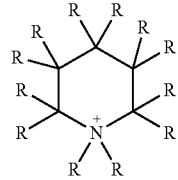
(6)

In formulae (3) to (6), each R is independently a hydrocarbon group having from 1 to 20 carbon atoms that may include a hetero atom.

Examples of the cation represented by formula (2) above include organic cations such as ammonium ions, sulfonium ions, phosphonium ions and oxonium ions, and of these, aliphatic quaternary ammonium ions and sulfonium ions (especially thiophenium ions) are preferred because the photoelectric conversion efficiency of the photoelectric conversion element of the present invention tends to improve.

On the other hand, specific examples of preferable anions contained in the organic salt compound (A) include $I^-$, $Br^-$, $AlCl_4^-$, $Al_2Cl_7^-$, $NO_3^-$, $BF_4^-$, $PF_6^-$, $CH_3COO^-$, $CF_3COO^-$, $CF_3SO_3^-$, $(CN)_4B^-$, $SCN^-$, $(CF_3SO_2)_2N^-$, $(CN)_2N^-$, $(CF_3SO_2)_3C^-$, $(CN)_3C^-$, $AsF_6^-$, $SbF_6^-$, $F(HF)_n^-$, $CF_3CF_2CF_2CF_2SO_3^-$, $(CF_3CF_2SO_2)_2N^-$, $CF_3CF_2CF_2COO^-$, and the like.

Of these, the anions are preferably bromine ions ($Br^-$) or iodine ions ($I^-$) and more preferably iodine ions ($I^-$) because the photoelectric conversion efficiency of the photoelectric conversion element of the present invention tends to be better.

In addition, from the perspective of improving the moist heat resistance of the photoelectric conversion element of the present invention, a thiocyanate anion ($SCN^-$) (including an isothiocyanate anion that is a linkage isomer. hereinafter the same also) is preferred. Because it is thought that this is an effect achieved in cases where a metal complex in which a thiocyanate anion is coordinated (for example, the ruthenium complex dye mentioned below) is used, as indicated by the working examples shown below, it is thought that even in cases where the coordination of a thiocyanate anion is lost from a metal complex by heating, it is possible to re-coordinate the thiocyanate anion of the organic salt compound (A), the metal complex can function as a dye, that is, absorb light, and it is possible to maintain the function of emitting electrons.

Examples of the above-mentioned organic salt compound (A) include organic salt compounds obtained by combining the cations and anions mentioned above.

Of these, an organic salt compound having an imidazolium ion as a cation and an iodide ion as an anion is preferred in order to improve the photoelectric conversion efficiency of photoelectric conversion element of the present invention, and in order to improve the moist heat resistance of photoelectric conversion element of the present invention, an organic salt compound having a thiocyanate anion is preferred and a combination of an organic salt compound having an imidazolium ion and an iodide ion and an organic salt compound having a thiocyanate anion is more preferred.

A synthesis method of the organic salt compound (A) is not particularly limited, and various types of organic salt compounds obtained by combining the cations and the anions described above can be synthesized by a conventionally known method.

This type of the above-mentioned organic salt compound (A) contains an organic salt compound (a1). This organic salt compound (a1) will now be explained, and the organic salt compound (a2), which is different from the organic salt compound (a1), of the above-mentioned organic salt compound (A) will then be explained.

(Organic Salt Compound (a1))

The above-mentioned organic salt compound (a1) is a compound in which at least one of the "optional substituent group on $R^1$", "$R^2$" and "$R^3$" in formula (1) above is a hydrocarbon group which has 5 to 20 carbon atoms and which may contain a hetero atom, or a compound in which at least one of "$R^4$", "$R^5$", "$R^6$" and "$R^7$" is a hydrocarbon group which has 5 to 20 carbon atoms and which may contain a hetero atom.

Examples of the hydrocarbon groups represented by at least one of $R^2$, $R^3$ and the optional substituent group on $R^1$ in formula (1) above, which have 5 to 20 carbon atoms and which may contain a hetero atom, include alkyl groups having from 5 to 20 carbon atoms (for example, a pentyl group, a hexyl group, a heptyl group, an octyl group, an ethylhexyl group, a nonyl group, a decyl group, a dodecyl group, an undecyl group, a hexadecyl group, an octadecyl group, a cyclopropylmethyl group, a trifluoroethyl group, and the like); aryl groups having from 6 to 20 carbon atoms (for example, a phenyl group, a tolyl group, a naphthyl group, and the like); aralkyl groups having from 7 to 20 carbon atoms (for example, a benzyl group, a phenylethyl group, a phenylpropyl group, and the like); alkoxy groups having from 5 to 20 carbon atoms (for example, an n-pentoxy group, an n-hexoxy group, a 1,2-dimethylbutoxy group, a heptoxy group, an octoxy group, a nonynoxy group, a decyloxy group, a phenoxy group, a methylphenoxy group, an ethylphenoxy group, and the like); and alkylalkoxy groups having from 5 to 20 carbon atoms (for example, an n-propylene-iso-propoxy group (—CH$_2$CH$_2$CH$_2$OCH(CH$^3$)2), a methylene-t-butoxy group (—CH$_2$—O—C(CH3)3), a butylene methoxy group, a pentylene methoxy group, a hexylene methoxy group, a heptylene methoxy group, an octylene methoxy group, a nonylene methoxy group, a decylene methoxy group, a methylene ethoxy group, an ethylene ethoxy group, a propylene ethoxy group, a butylene ethoxy group, a pentylene ethoxy group, a hexylene ethoxy group, an ethylene ethoxy methoxy group, a cyclopropyl methoxy group, a cyclohexyl methoxy group, a methylphenoxy group, a methoxyphenoxy group, an ethoxyphenoxy group, a phenoxyphenoxy group, and the like).

Of these, a hydrocarbon group which has 6 to 20 carbon atoms and which may contain a hetero atom is preferred, a hydrocarbon group which has 6 to 18 carbon atoms and which may contain a hetero atom is more preferred and an alkyl group having from 6 to 18 carbon atoms (a hexyl group, a heptyl group or an octyl group) is further preferred from the perspective of improving the moisture resistance of the photoelectric conversion element of the present invention.

Specific examples of the hydrocarbon groups represented by at least one of $R^4$, $R^5$, $R^6$ and $R^7$ in formula (2) above, which have 5 to 20 carbon atoms and which may contain a hetero atom, include the hydrocarbon groups represented by at least one of $R^2$ and $R^3$ in formula (1) above, which have 5 to 20 carbon atoms and which may contain a hetero atom.

Preferred examples of the cation represented by formula (1) above of the above-mentioned organic salt compound (a1) include cations represented by formulae (3) to (6) above, and at least one of the R groups in formulae (3) to (6) above is each independently a hydrocarbon group which has 5 to 20 carbon atoms and which may contain a hetero atom.

More specific examples include the following cations.

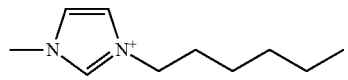

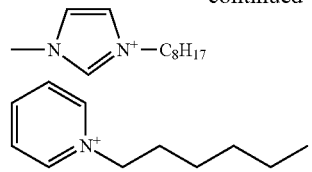

Preferred examples of the cation represented by formula (2) above of the above-mentioned organic salt compound (a1) include the following cations.

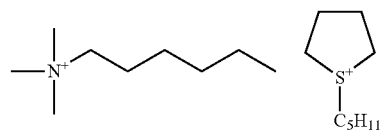

The above-mentioned organic salt compound (a1) can be a synthetic product such as 1-methyl-3-pentyl imidazolium iodide, 1-methyl-3-hexyl imidazolium iodide, 1-methyl-3-octyl imidazolium iodide, 1-methyl-3-nonyl imidazolium iodide, 1-methyl-3-decyl imidazolium iodide, 1-methyl-3-dodecyl imidazolium iodide, 1-methyl-3-hexadecyl imidazolium iodide, 1-methyl-3-octadecyl imidazolium iodide, 1-((2-methoxyethoxy)ethyl)-3-((2-methoxyethoxy)ethyl) imidazolium iodide, 1-allyl-3-pentyl imidazolium iodide, 1-allyl-3-hexyl imidazolium iodide, 1-allyl-3-octyl imidazolium iodide, 1-allyl-3-nonyl imidazolium iodide, 1-allyl-3-decyl imidazolium iodide, 1-allyl-3-dodecyl imidazolium iodide, 1-allyl-3-hexadecyl imidazolium iodide, 1-allyl-3-octadecyl imidazolium iodide, 1-methyl-3-pentyl imidazolium thiocyanate, 1-methyl-3-hexyl imidazolium thiocyanate, 1-methyl-3-octyl imidazolium thiocyanate, 1-methyl-3-nonyl imidazolium thiocyanate, 1-methyl-3-decyl imidazolium thiocyanate, 1-methyl-3-dodecyl imidazolium thiocyanate, 1-methyl-3-hexadecyl imidazolium thiocyanate, 1-methyl-3-octadecyl imidazolium thiocyanate, 1-((2-methoxyethoxy)ethyl)-3-((2-methoxyethoxy)ethyl)imidazolium thiocyanate, 1-methyl-3-pentyl pyrrolidinium iodide, 1-methyl-3-hexyl pyrrolidinium iodide, 1-methyl-3-octyl pyrrolidinium iodide, 1-methyl-3-nonyl pyrrolidinium iodide, 1-methyl-3-decyl pyrrolidinium iodide, 1-methyl-3-dodecyl pyrrolidinium iodide, 1-methyl-3-hexadecyl pyrrolidinium iodide, 1-methyl-3-octadecyl pyrrolidinium iodide, 1-((2-methoxyethoxy)ethyl)-3-((2-methoxyethoxy)ethyl)pyrrolidinium iodide, tetrapentyl ammonium iodide, tetrahexyl ammonium iodide, tetraheptyl ammonium iodide, tetrapentyl ammonium thiocyanate, tetrahexyl ammonium thiocyanate, tetraheptyl ammonium thiocyanate, pentyl tetrahydrothiophenium iodide, hexyl tetrahydrothiophenium iodide, heptyl tetrahydrothiophenium iodide, octyl tetrahydrothiophenium iodide, nonyl tetrahydrothiophenium iodide, pentyl tetrahydrothiophenium thiocyanate, hexyl tetrahydrothiophenium thiocyanate, heptyl tetrahydrothiophenium thiocyanate, octyl tetrahydrothiophenium thiocyanate or nonyl tetrahydrothiophenium thiocyanate, or a commercially available product. Specifically, it is possible to use, for example, 1-methyl-3-hexyl imidazolium iodide (manufactured by Merck), 1-methyl-3-octyl imidazolium iodide (manufactured by Merck), 1-methyl-3-dodecyl imidazolium iodide (manufactured by Merck), 1-methyl-3-hexyl imidazolium thiocyanate (manufactured by Toyo Gosei Co., Ltd.), 1-methyl-3-octyl imidazolium thiocyanate (manufactured by Merck), tetrapentyl ammonium iodide (manufactured by Merck), tetrahexyl ammonium iodide (manufactured by Tokyo Chemical Industry Co., Ltd.), tetraheptyl ammonium iodide (manufactured by Tokyo Chemical Industry Co., Ltd.), tetrapentyl ammonium thiocyanate (manufactured by Merck), tetrahexyl ammonium thiocyanate (manufactured by Merck), tetraheptyl ammonium thiocyanate (manufactured by Merck) and the like.

Moreover, because some organic salt compounds exhibit tautomerism, the organic salt compound (a1) of the present invention and the organic salt compound (a2), which is described below, include tautomers.

Specifically, "1-methyl-3-pentyl imidazolium iodide" includes "1-pentyl-3-methyl imidazolium iodide", which is a tautomer thereof, and "1-methyl-3-hexyl imidazolium iodide" includes "1-hexyl-3-methyl imidazolium iodide", which is a tautomer thereof.

In the present invention, more than 50 mass %, in terms of cationic weight, of the above-mentioned organic salt compound (A) is the above-mentioned organic salt compound (a1). In such cases, the photoelectric conversion element of the present invention exhibits excellent moisture resistance.

It is thought that this is because if the cation of the above-mentioned organic salt compound (a1), which accounts for more than 50 mass %, in terms of cationic weight, of the above-mentioned organic salt compound (A), has a long chain hydrocarbon group having from 5 to 20 carbon atoms, the above-mentioned organic salt compound (A) per se becomes hydrophobized and it is possible to prevent contamination by water vapor present in the atmosphere.

Moreover, "in terms of cationic weight" means the mass of cations, without anions, in the above-mentioned organic salt compound (A) (the organic salt compound (a1) and the organic salt compound (a2)).

In addition, in order to improve the moisture resistance and photoelectric conversion efficiency of the photoelectric conversion element of the present invention, the content of the above-mentioned organic salt compound (a1) is preferably 90 mass % or lower, more preferably greater than 50 mass % but not greater than 85 mass %, and further preferably greater than 50 mass % but not greater than 80 mass %, in terms of cationic weight, of the above-mentioned organic salt compound (A).

Furthermore, in order to improve the moisture resistance of the photoelectric conversion element of the present invention, it is preferable to incorporate an organic salt compound having a thiocyanate anion, as mentioned above, but the content thereof is preferably 10 to 30 mass % of the above-mentioned organic salt compound (A).

(Organic Salt Compound (a2))

The above-mentioned organic salt compound (a2) is a compound in which the hydrocarbon groups represented by $R^2$ and $R^3$ in formula (1) above are hydrocarbon groups having from 1 to 4 carbon atoms and optionally having a hetero atom, or a compound in which the hydrocarbon groups represented by $R^4$, $R^5$, $R^6$ and $R^7$ in formula (2) above are hydrocarbon groups having from 1 to 4 carbon atoms and optionally having a hetero atom.

Examples of the hydrocarbon groups represented by $R^2$ and $R^3$ in formula (1) above, which have 1 to 4 carbon atoms and which may contain a hetero atom, include alkyl groups having from 1 to 4 carbon atoms (for example, a methyl group, an ethyl group, a propyl group, a butyl group, and the like), alkoxy groups having from 1 to 4 carbon atoms (for example, a methoxy group, an ethoxy group, an n-propoxy group, an iso-propoxy group, an n-butoxy group, a tert-butoxy group, a sec-butoxy group, and the like), and alkylalkoxy groups having from 2 to 4 carbon atoms (for example, a methylene methoxy group ($—CH_2OCH_3$), an ethylene methoxy group ($—CH_2CH_2OCH_3$), and the like).

Examples of the hydrocarbon groups represented by $R^4$, $R^5$, $R^6$ and $R^7$ in formula (2) above, which have 1 to 4 carbon atoms and which may contain a hetero atom, include those hydrocarbon groups represented by $R^2$ and $R^3$ in formula (1) above, which have 1 to 4 carbon atoms and which may contain a hetero atom.

Preferred examples of the cation represented by formula (1) above of the above-mentioned organic salt compound (a2) include cations represented by formulae (3) to (6) above, and one or more of the R groups bonded to $N^+$ in formulae (3) to (6) above are each independently a hydrocarbon group which has 1 to 4 carbon atoms and which may contain a hetero atom.

More specific examples include the following cations.

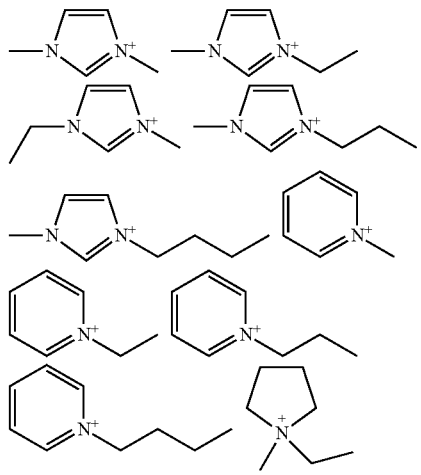

Preferred examples of the cation represented by formula (2) above of the above-mentioned organic salt compound (a2) include the following cations.

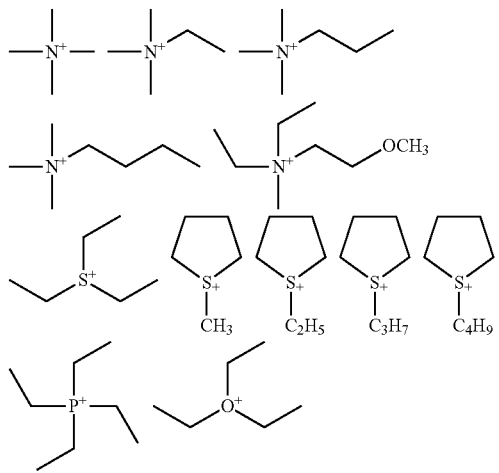

The above-mentioned organic salt compound (a2) can be a synthetic product such as 1-methyl-3-methyl imidazolium iodide, 1-ethyl-3-methyl imidazolium iodide, 1-methyl-1-butyl pyrrolidinium thiocyanate or 1-methyl-1-ethyl pyrrolidinium thiocyanate, or a commercially available product. Specifically, it is possible to use, for example, 1-methyl-3- propyl imidazolium iodide (manufactured by Tokyo Chemical Industry Co., Ltd.), 1-methyl-3-butyl imidazolium iodide (manufactured by Tokyo Chemical Industry Co., Ltd.), 1-methyl-1-methyl-pyrrolidinium iodide (manufactured by Sigma-Aldrich Co. LLC.), 1-ethyl-3-methylimidazolium tetracyanoborate (manufactured by Merck), 1-ethyl-3-methyl imidazolium thiocyanate (manufactured by Merck), 1-methyl-3-butyl imidazolium thiocyanate (manufactured by BASF), 1-ethyl-3-methyl imidazolium bis(trifluoromethylsulfonyl)imide (manufactured by Solvent Innovation), tetramethyl ammonium iodide (manufactured by Tokyo Chemical Industry Co., Ltd.), tetraethyl ammonium iodide (manufactured by Tokyo Chemical Industry Co., Ltd.), tetrapropyl ammonium iodide (manufactured by Tokyo Chemical Industry Co., Ltd.), tetrabutyl ammonium iodide (manufactured by Tokyo Chemical Industry Co., Ltd.), tetramethyl ammonium thiocyanate (manufactured by Merck), tetraethyl ammonium thiocyanate (manufactured by Merck), tetrapropyl ammonium thiocyanate (manufactured by Merck), tetrabutyl ammonium thiocyanate (manufactured by Merck), methyl tetrahydrothiophenium iodide (manufactured by Merck), ethyl tetrahydrothiophenium iodide (manufactured by Merck), propyl tetrahydrothiophenium iodide (manufactured by Merck), butyl tetrahydrothiophenium iodide (manufactured by Merck), methyl tetrahydrothiophenium tetracyanoborate (manufactured by Merck), ethyl tetrahydrothiophenium tetracyanoborate (manufactured by Merck), propyl tetrahydrothiophenium tetracyanoborate (manufactured by Merck), butyl tetrahydrothiophenium tetracyanoborate (manufactured by Merck), methyl tetrahydrothiophenium thiocyanate (manufactured by Merck), ethyl tetrahydrothiophenium thiocyanate (manufactured by Merck), propyl tetrahydrothiophenium thiocyanate (manufactured by Merck), butyl tetrahydrothiophenium thiocyanate (manufactured by Merck), and the like.

In the present invention, less than 50 vol. %, and preferably not less than 15 vol. % but less than 50 vol. %, of the above-mentioned organic salt compound (A) is the above-mentioned organic salt compound (a2).

Moreover, the above-mentioned organic salt compound (a1) and the above-mentioned organic salt compound (a2) may be solids as individual substances, but the above-mentioned organic salt compound (A), which contains a mixture of the above-mentioned organic salt compound (a1) and the above-mentioned organic salt compound (a2), is preferably a liquid (that is, an ionic liquid).

The content of the above-mentioned organic salt compound (A) is preferably 50 to 95 mass %, and more preferably 65 to 95 mass %, relative to the total mass of the electrolyte of the present invention. If the content is within this range, the photoelectric conversion efficiency of the photoelectric conversion element of the present invention will be better.

<Lamellar Clay Mineral (B)>

The lamellar clay mineral (B) that is used in the electrolyte of the present invention is not particularly limited, but is preferably a phyllosilicate having a silicic acid tetrahedron bonded in a bi-dimensional sheet-like form. Specific examples thereof include smectite-based clay minerals such as montmorillonite, saponite, beidellite, nontronite, hectorite, stevensite, and the like; vermiculite-based clay minerals such as vermiculite and the like; mica-based clay minerals such as muscovite, phlogopite, mica, and the like. One of these may be used alone, or two or more may be used in combination.

In addition, lamellar clay mineral (B) that is used in the electrolyte of the present invention may be a natural material or a synthesized product.

Of these, smectite-based clay minerals that expand in water and have cation exchange capacity or expanding mica is preferable.

The cation exchange capacity of the lamellar clay mineral is preferably 10 to 300 milliequivalents/100 g.

Preferred examples of commercially available products that can be used as such a lamellar clay mineral (B) include natural montmorillonite (trade name: Kunipia F, manufactured by Kunimine Industries Co., Ltd.; average particle size: 0.1 to 1 µm), synthetic smectite (trade name: Sumecton S A, manufactured by Kunimine Industries Co., Ltd.; average particle size: 20 nm), synthetic expanding mica (trade name: Somasif ME-100, manufactured by Co-op Chemical Co., Ltd.; average particle size: 5 to 7 µm); synthetic smectite (trade name: Lucentite SWN, manufactured by Co-op Chemical Co., Ltd.; average particle size: 0.02 µm); and synthetic smectite (trade name: Lucentite SWF, manufactured by Co-op Chemical Co., Ltd.; average particle size: 0.02 µm).

In the present invention, an organically modified lamellar clay mineral can be used as the lamellar clay mineral (B).

The organically modified lamellar clay mineral can be obtained by inter-layer cation-exchanging in the lamellar clay mineral and can be obtained by, for example, adding organic onium ions to a water-based slurry of the lamellar clay mineral and mixing in order to induce a reaction. In addition, the organically modified lamellar clay mineral can be obtained by adding organic onium ions to a solvent dispersion of the above-mentioned lamellar clay mineral and mixing in order to induce an organic onium ion (cation) exchange reaction.

"Organic onium ions" are ions that are generated from an organic onium compound produced by coordinate bonding a proton or another cationic reagent, or the like, to a lone electron pair in a compound containing an element such as oxygen, sulfur, nitrogen, and the like that has a lone electron pair.

Conditions for organically modifying using the organic onium ions are not particularly limited, and the reaction is preferably induced using an amount of the organic onium ions 0.3 to 2.0 times, and more preferably induced using an amount of the organic onium ions 0.5 to 1.5 times the cation exchange capacity of the lamellar clay mineral, and the reaction is preferably induced at a temperature of 10 to 95° C.

Examples of the organic onium ions include ammonium ions, phosphonium ions, oxonium ions, sulfonium ions, and the like.

Of these, ammonium ions are the most common, and specific examples thereof include aliphatic ammonium ions, pyridinium ions, quinolinium ions, imidazolium ions, pyrrolidinium ions, piperidinium ions, betaines, lecithin, cation dyes (pigments), and the like.

Additionally, the aliphatic ammonium ions expressed by formulae (I) and (II) below are preferable, and examples thereof include hydroxypolyoxyethylene trialkylammonium, hydroxypolyoxypropylene trialkylammonium, di(hydroxypolyoxyethylene)dialkylammonium, di(hydroxypolyoxypropylene)dialkylammonium, dimethyldioctylammonium, dimethyldidodecylammonium, methylethyldioctylammonium, methyltrioctylammonium, methyltridodecylammonium, benzylmethyldioctylammonium, benzylmethyldidodecylammonium, benzylethyldioctylammonium, benzyltrioctylammonium, benzyltridodecylammonium, and the like.

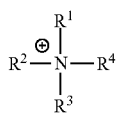
(I)

In formula (I), $R^4$ is a hydrocarbon group having from 1 to 30 carbon atoms; $R^2$ and $R^3$ are each independently a polyoxyethylene group (—$(CH_2CH_2O)_n$—H), a polyoxypropylene group (—$(CH_2CH(CH_3)O)_n$—H, —$(CH_2CH_2CH_2O)_n$—H), or a hydrocarbon group having from 1 to 10 carbon atoms; and $R^4$ is a polyoxyethylene group (—$(CH_2CH_2O)_n$—H) or a polyoxypropylene group (—$(CH_2CH(CH_3)O)_n$—H, —$(CH_2CH_2CH_2O)_n$—H). Moreover, n is an integer from 1 to 50.

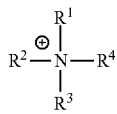
(II)

In formula (II), $R^1$ is a methyl group or a benzyl group; $R^2$ is a hydrocarbon group having from 1 to 3 carbon atoms or a hydrocarbon group having from 6 to 15 carbon atoms; and $R^3$ and $R^4$ are each independently a hydrocarbon group having from 6 to 15 carbon atoms.

Examples of commercially available products that can be used as such an organically modified lamellar clay mineral include S-BEN NX, S-BEN WX, Organite, and Organite D (all manufactured by Hojun Co., Ltd.); Lucentite SEN, Lucentite SPN, Lucentite SAN, Lucentite STN, Somasif MAE, Somasif MEE, Somasif MPE, and Somasif MTE (all manufactured by Co-op Chemical Co., Ltd.); and the like.

In the present invention, from the perspective of improving the moist heat resistance of the photoelectric conversion element of the present invention, the lamellar clay mineral (B) preferably contains an alkylsilyl group.

Examples of the lamellar clay mineral (B) containing an alkylsilyl group include reactant products of the lamellar clay minerals described above (hereinafter also referred to as "lamellar clay mineral (b1)") and an organosilane compound (b2) described below; commercially available products described below; and the like.

Organosilane Compound (b2)

Examples of the organosilane compound (b2) used in the preparation of the lamellar clay mineral (B) include products expressed by formula (III) below.

(III)

In formula (III), $R^8$ is a monovalent hydrocarbon group that may be branched, having from 1 to 25 carbon atoms, and may contain a hetero atom. $R^9$ is a hydrolyzable group, and n is an integer from 1 to 3. When n is 2 or 3, the plurality of $R^8$ moieties may be the same or different, and when n is 1 or 2, the plurality of $R^9$ moieties may be the same or different.

Examples of the monovalent hydrocarbon group that may be branched, having from 1 to 25 carbon atoms in formula (III), $R^8$, include methyl groups, ethyl groups, propyl groups, isopropyl groups, n-butyl groups, isobutyl groups, sec-butyl groups, tert-butyl groups, n-pentyl groups, isopentyl groups, neopentyl groups, tert-pentyl groups, 1-methylbutyl groups, 2-methylbutyl groups, 1,2-dimethylpropyl groups, hexyl groups, heptyl groups, octyl groups, nonyl groups, decyl groups, dodecyl groups, tridecyl groups, tetradecyl groups, hexadecyl groups, octadecyl groups, cyclohexyl groups, vinyl groups, allyl groups, phenyl groups, tolyl groups, styryl groups, α-methylstyryl groups, and the like; functional groups (e.g. chloromethyl groups, chloropropyl groups, trifluoropropyl groups, and the like) wherein part or all of the hydrogen atoms bonded to the carbon atoms of the groups described above are substituted with a halogen atom (e.g. fluorine, chlorine and the like); and the like.

Moreover, examples of the hydrolyzable group in formula (III), $R^9$, include alkoxy groups, acyl groups, halogen groups, and the like.

Examples of the compound expressed by formula (III) include methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-pentyltriethoxysilane, cyclohexyltrimethoxysilane, phenyltrimethoxysilane, hexyltrimethoxysilane, octyltriethoxysilane, nonyltriethoxysilane, decyltriethoxysilane, dodecyltriethoxysilane, tridecyltriethoxysilane, tetradecyltriethoxysilane, pentadecyltriethoxysilane, dimethyldimethoxysilane, dimethyldiethoxysilane, diethyldimethoxysilane, diethyldiethoxysilane, di-n-propyldimethoxysilane, di-i-propyldimethoxysilane, di-n-butyldimethoxysilane, n-pentyl•methyldimethoxysilane, cyclohexyl•methyldiethoxysilane, phenyl•methyldimethoxysilane, di-n-pentyldimethoxysilane, di-n-hexyldimethoxysilane, di-n-heptyldimethoxysilane, di-n-octyldimethoxysilane, dicyclohexyldimethoxysilane, diphenyldimethoxysilane, trimethylmethoxysilane, triethylmethoxysilane, tri-n-propylmethoxysilane, tri-i-propylmethoxysilane, tri-n-butylmethoxysilane, tri-n-pentylmethoxysilane, tri-cyclohexylmethoxysilane, triphenylmethoxysilane, tri-n-hexylmethoxysilane, tri-n-heptylmethoxysilane, tri-n-octylmethoxysilane, tricyclohexylmethoxysilane, triphenylmethoxysilane, tridecylmethoxysilane, vinyltrichlorosilane, vinyltrimethoxysilane, vinyltriethoxysilane, vinyl-tris(methoxyethoxy)silane, vinyltriisopropoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-acryloxypropyltrimethoxysilane, 3-mercaptopropylmethyldimethoxysilane, 3-mercaptopropyltrimethoxysilane, bis(triethoxysilylpropyl)disulfide, bis(triethoxysilylpropyl)tetrasulfide, methyltrichlorosilane, methyldichlorosilane, dimethyldichlorosilane, trimethylchlorosilane, phenyltrichlorosilane, diphenyldichlorosilane, octyldimethylchlorosilane, trifluoropropyltrichlorosilane, cyclohexylmethyldimethoxysilane, trifluoropropyltrimethoxysilane, triphenylsilanol, hexamethyldisilazane, methyltriphenoxysilane, and the like. One of these may be used alone, or two or more may be used in combination.

Of these, from the perspective of being able to suppress hygroscopicity of the electrolyte in an element, methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-pentyltriethoxysilane, cyclohexyltrimethoxysilane, phenyltrimethoxysilane, hexyltrimethoxysilane, octyltriethoxysilane, nonyltriethoxysilane, dimethyldimethoxysilane, dimethyldiethoxysilane, diethyldimethoxysilane, diethyldiethoxysilane, di-n-propyldimethoxysilane, di-i-propyldimethoxysilane, di-n-butyldimethoxysilane, n-pentyl•methyldimethoxysilane, cyclohexyl•methyldiethoxysilane, phenyl•methyldimethoxysilane, diphenyldimethoxysilane, trimethylmethoxysilane, trimethylethoxysilane, triethylmethoxysilane, tri-n-propylmethoxysilane, tri-i-propylmethoxysilane, vinyltrimethoxysilane, vinyltriethoxysilane, 3-mercaptopropyltrimethoxysilane, bis(triethoxysilylpropyl)disulfide, bis(triethoxysilylpropyl)tetrasulfide, cyclohexylmethyldimethoxysilane, trifluoropropyltrimethoxysilane, hexamethyldisilazane, dimethoxymethyl trifluoropropylsilane, nonafluoro hexyltrichlorosilane, trifluoropropyl trichlorosilane, and methyltrifluoropropyl dichlorosilane are preferable.

Additionally, examples that can be used as the organosilane compound (b2) include condensation products of the compounds expressed by formula (III) including organopolysiloxane such as dimethylpolysiloxane, methylphenylpolysiloxane, methylhydrogenpolysiloxane, and the like.

Furthermore, organodisilazanes such as hexamethyldisilazane, divinyltetramethyldisilazane, and the like can be used as the organosilane compound (b2).

In the present invention, the reaction of the lamellar clay mineral (b1) and the organosilane compound (b2) described above is not particularly limited, and the lamellar clay mineral (B) containing an alkylsilyl group can be prepared by stirring these in an organic solvent such as methanol or the like at a temperature from about 0 to 250° C., thereby reacting the hydroxy group contained in the lamellar clay mineral (b1) and the hydrolyzable group contained in the organosilane compound (b2).

Here, "the hydroxy group contained in the lamellar clay mineral (b1)" refers to the hydroxy group generally contained in the crystalline layer (in most cases, the end face) of a known lamellar clay mineral such as montmorillonite, smectite, or the like. However, in the reaction described above, all of the hydroxy groups contained in the lamellar clay mineral (b1) need not be substituted by alkylsilyl groups.

Note that, in the reaction described above, following or simultaneous with the reaction between the lamellar clay mineral (b1) and the organosilane compound (b2), a hydrolyzable group derived from the organosilane compound (b2) (the functional group unreacted with the lamellar clay mineral (b1)) may be hydrolyzed or condensed.

On the other hand, in the present invention, examples of products that can be preferably used as the lamellar clay mineral (B) containing an alkylsilyl group include commercially available products such as silane-treated montmorillonite treated with alkyltrialkoxysilane (Bengel S H, manufactured by Hojun Co., Ltd.), silane-treated organic bentonite treated with quaternary ammonium and alkyltrialkoxysilane (manufactured by Hojun Co., Ltd.), and the like.

By including the lamellar clay mineral (B) containing an alkylsilyl group described above, a photoelectric conversion element having superior moisture resistance can be formed.

While the reasons why this is so are not specifically clear, it is thought that the lamellar clay mineral (B) containing the alkylsilyl group prevents the intrusion of atmospheric water vapor due to the lamellar clay mineral (B) being hydrophobized to a greater degree than conventional lamellar clay minerals.

In the present invention, the content of the lamellar clay mineral (B), when indicated as the content of inorganic matter, is preferably 1 to 250 parts by mass, and more preferably 2 to 150 parts by mass, per 100 parts by mass of the organic salt compound (A).

Here, "indicated as the content of inorganic matter" refers to the mass excluding the inter-layer cations in the above-mentioned lamellar clay mineral (B), that is, excluding the above-mentioned organic onium ions.

<Organic Solvent (C)>

The organic solvent (C) that is optionally included in the electrolyte of the present invention is not particularly limited, provided that the organic solvent (C) is an organic solvent having a boiling point of not less than 150° C. and a relative dielectric constant of not less than 20.

Here, "boiling point" refers to a boiling point at 1 atmosphere, and "relative dielectric constant" refers to a value measured using a Liquid Dielectric Constant Meter (Liquid Dielectric Constant Meter Model M-870, manufactured by Nihon Rufuto, Co., Ltd.), having 25° C. and 10 kHz applied.

Specifically, the above-mentioned organic solvent (C) can be, for example, methoxypropionitrile (boiling point: 166° C., relative dielectric constant: 25), ethoxypropionitrile (boiling point: 171° C., relative dielectric constant: 22), butoxypropionitrile (boiling point: 206° C., relative dielectric constant: 20), dimethoxypropionitrile (boiling point: 195° C., relative dielectric constant: 28), glutaronitrile (boiling point: 286° C., relative dielectric constant: 20), ethylene glycol bis(propionitrile)ether (boiling point: 330° C., relative dielectric constant: 20), propylene carbonate (boiling point: 240° C., relative dielectric constant: 65), diethyl carbonate (boiling point: 240° C., relative dielectric constant: 65), ethyl methyl carbonate (boiling point: 240° C., relative dielectric constant: 65), γ-butyrolactone (boiling point: 205° C., relative dielectric constant: 65), γ-valerolactone (boiling point: ° C., relative dielectric constant: 58), dimethyl sulfoxide (boiling point: 189° C., relative dielectric constant: 47), ethyl isopropyl sulfone (boiling point: 250° C., relative dielectric constant: 32), sulfolane (boiling point: 285° C., relative dielectric constant: 38), methylsulfolane (boiling point: 270° C., relative dielectric constant: 32), and the like. One of these may be used alone, or two or more may be used in combination. Note that when two or more of these are used in combination, for example, a high dielectric constant solvent (cyclic carbonates) such as ethylene carbonate, propylene carbonate, butylene carbonate, or the like; and a low viscosity solvent (chain carbonates) such as dimethyl carbonate, ethylmethyl carbonate, diethyl carbonate, ethyl-n-butyl carbonate, methyl-t-butyl carbonate, di-i-propyl carbonate, t-butyl-i-propyl carbonate, or the like may be appropriately mixed so long as the object of the present invention is not impaired.

Of these, methoxypropionitrile, ethoxy propionitrile, or butoxy propionitrile are preferably used because the photoelectric conversion efficiency of the photoelectric conversion element using the electrolyte of the present invention (hereinafter also referred to as the "photoelectric conversion element of the present invention") will be better; propylene carbonate, diethyl carbonate, ethylmethyl carbonate, or γ-butyrolactone are preferably used because of being readily available and low cost; and ethyl isopropyl sulfone, sulfolane, or methyl sulfolane is preferably used because of being electrochemically stable and because little cracked gas is generated.

In the present invention, by including the organic solvent (C) described above, a photoelectric conversion element having superior moisture resistance can be formed.

While the reasons why this is so are not specifically clear, it is thought that this is a result of the hygroscopicity of the organic solvent (C) being lower than that of the ionic liquid, volatilization when used for an extended period of time being low, and solubility with respect to other electrolyte components being high.

If the above-mentioned organic solvent (C) is contained in the present invention, the content thereof is preferably 0.5 to 40 parts by mass, and more preferably 1 to 30 parts by mass, relative to 100 parts by mass of the above-mentioned organic salt compound (A). If the content is within this range, the photoelectric conversion efficiency of the photoelectric conversion element of the present invention will be better.

In addition, if the organic solvent (C) is contained in the present invention, the ratio (C/A) of the above-mentioned organic solvent (C) to the above-mentioned organic salt compound (A) is preferably 29/71 to 0.5/99.5 and more preferably 23/77 to 1/99 from the perspectives of maintaining superior moisture resistance of the photoelectric conversion element of the present invention and suppressing elution of a photosensitized dye (particularly an organic dye) in the dye-sensitized solar cell of the present invention.

<Other Components>

A redox couple can be added to the electrolyte of the present invention in order to enhance the photoelectric conversion efficiency of the photoelectric conversion element of the present invention.

Any conventional product commonly used for, or that can be used for, dye-sensitized solar cells may be used as the redox couple so long as the object of the present invention is not impaired.

For example, iodine/iodide ion pairs, bromine/bromide ion pairs, and the like can be used. Specific examples thereof include iodine/iodide ion pairs such as metal iodides of iodine and LiI, NaI, KI, or the like, iodide salts of iodine and a quaternary imidazolium compound, iodide salts of iodine and a quaternary pyridinium compound, iodide salts of iodine and a tetralkylammonium compound, and the like; bromine/bromide ion pairs such as metal bromides of bromine and LiBr, NaBr, KBr, and the like, bromide salts of bromine and a quaternary imidazolium compound, bromide salts of bromine and a quaternary pyridinium compound, bromide salts of bromine and a tetralkylammonium compound, and the like; metal complexes such as ferrocyanate-ferricyanate, ferrocene-ferricinium salt, and the like; sulfur compounds of a disulfide compound and a mercapto compound; hydroquinone; quinone; and the like. One of these may be used alone, or two or more may be used in combination.

Of these, iodine/iodide ion pairs and bromine/bromide ion pairs are preferable.

Additionally, an inorganic salt and/or an organic salt can be added to the electrolyte of the present invention in order to enhance short current of the photoelectric conversion element of the present invention.

Examples of the inorganic salt and/or organic salt include alkali metals, alkali earth metal salts, and the like, such as lithium iodide, sodium iodide, potassium iodide, magnesium iodide, calcium iodide, lithium trifluoroacetate, sodium trifluoroacetate, lithium thiocyanate, lithium tetrafluoroborate, lithium hexafluorophosphate, lithium perchlorate, lithium trifluoromethanesulfonate, lithium bis(trifluoromethanesulfonyl)imide, a guanidine salt such as guanidine thiocyanate, and the like. One of these may be used alone, or two or more may be used in combination.

An added amount of the inorganic salt and/or organic salt is not particularly limited and may be a conventional amount so long as the object of the present invention is not inhibited.

Additionally, a pyridine and/or a benzimidazole can be added to the electrolyte of the present invention in order to enhance the open voltage of the photoelectric conversion element of the present invention.

Specific examples include alkylpyridines such as methylpyridine, ethylpyridine, propylpyridine, butylpyridine, and the like; alkylimidazoles such as methylimidazole, ethylimidazole, propylimidazole, and the like; alkylbenzimidazoles such as methylbenzimidazole, ethylbenzimidazole, butylbenzimidazole, propylbenzimidazole, and the like; and the like. One of these may be used alone, or two or more may be used in combination.

An added amount of the pyridines and/or the benzimidazoles is not particularly limited and can be a conventional amount, so long as the object of the present invention is not inhibited.

An organic solvent other than the organic solvent (C) may be added to the electrolyte of the present invention, and specific examples thereof include carbonate esters such as ethylene carbonate, propylene carbonate, and the like; ethers such as ethylene glycol dialkyl ether, propylene glycol dialkyl ether, and the like; alcohols such as ethylene glycol monoalkyl ether, propylene glycol monoalkyl ether, and the like; polyhydric alcohols such as ethylene glycol, propylene glycol, and the like; nitriles such as acetonitrile, propionitrile, methoxypropionitrile, cyanoethyl ether, glutaronitrile, valeronitrile, and the like; lactones such as γ-butyrolactone and the like; amides such as dimethylformamide, N-methylpyrrolidone, and the like; aprotic polar solvents such as dimethyl sulfoxide, sulfolane, and the like; and the like. One of these may be used alone, or two or more may be used in combination.

An added amount of the organic solvent is not particularly limited and can be a conventional amount so long as the object of the present invention is not inhibited.

<Manufacturing Method>

A manufacturing method of the electrolyte of the present invention is not particularly limited and can be, for example, manufactured by mixing the above-mentioned organic salt compound (A), the above-mentioned lamellar clay mineral (B) and the optionally contained above-mentioned organic solvent (C), and the like, and then thoroughly mixing and uniformly dispersing (kneading) using a ball mill, sand mill, pigment disperser, grinder, ultrasonic disperser, homogenizer, planetary mixer, Hobart mixer, roll, kneader, or the like at room temperature or under heating (for example, 40 to 150° C.)

Here, as necessary, an organic solvent (e.g. toluene or the like) can be mixed in with the mixture described above and, after the mixing, the organic solvent may be removed using vacuum distillation.

<Photoelectric Conversion Element, Dye-Sensitized Solar Cell>

Next, the photoelectric conversion element and the dye-sensitized solar cell of the present invention will be described using FIG. 1. FIG. 1 is a schematic cross-sectional view illustrating an example of a basic configuration of a photoelectric conversion element of the present invention.

The photoelectric conversion element of the present invention includes a photoelectrode having a transparent conductive film and a metal oxide semiconductor porous film, a counterelectrode disposed so as to oppose the photoelectrode, and an electrolyte layer provided between the photoelectrode and the counterelectrode.

<Photoelectrode>

As illustrated in FIG. 1, the photoelectrode is, for example, constituted by a transparent plate 1, a transparent conductive film 2, and an oxide semiconductor porous film 3.

Here, the transparent plate 1 preferably has excellent optical transparency, and specific examples include, in addition to glass plates, resin plates (films) such as polystyrene, polyethylene, polypropylene, polyethylene terephthalate, polyethylene naphthalate, polycarbonate, polyphenylene sulfide, cyclic olefin polymer, polyether sulfone, polysulfone, polyetherimide, polyarylate, triacetylcellulose, methyl polymethacrylate, and the like.

Additionally, specific examples of the transparent conductive film 2 include electrically conductive metal oxides such as tin oxide doped with antimony or fluorine, zinc oxide doped with aluminum or gallium, indium oxide doped with tin, and the like.

Moreover, a thickness of the transparent conductive film 2 is preferably from about 0.01 to 1.0 µm.

Furthermore, the method for providing the transparent conductive film 2 is not particularly limited, and examples thereof include coating methods, sputtering methods, vacuum vapor deposition methods, spray pyrolysis methods, chemical vapor deposition (CVD) methods, sol-gel methods, and the like.

Next, the oxide semiconductor porous film 3 is obtained by applying a dispersion of oxide semiconductor particles on the transparent conductive film 2.

Specific examples of the oxide semiconductor particles include titanium oxide, tin oxide, zinc oxide, tungstic oxide, zirconium oxide, hafnium oxide, strontium oxide, vanadium oxide, niobium oxide, and the like. One of these may be used alone, or two or more may be used in combination.

The dispersion is obtained by mixing the oxide semiconductor particles and a carrier medium using a disperser such as a sand mill, bead mill, ball mill, three-roll mill, colloid mill, ultrasonic homogenizer, Henschel mixer, jet mill, or the like.

Additionally, the dispersion, after being obtained by mixing using the disperser and immediately prior to use (application), is preferably subjected to ultrasonic treatment using an ultrasonic homogenizer or the like. By performing the ultrasonic treatment immediately prior to use, the photoelectric conversion efficiency of the photoelectric conversion element of the present invention will be better. Reasons for this are thought to be that the filling of the oxide semiconductor porous film, formed using the dispersion that has been subjected to ultrasonic treatment immediately prior to use, with the electrolyte of the present invention including the organic salt compound (A) is facilitated and the adsorption capacity of the dye is increased.

Furthermore, acetyl acetone, hydrochloric acid, nitric acid, surfactants, chelating agents, and the like may be added to the dispersion in order to prevent the oxide semiconductor particles in the dispersion from re-aggregating; and a polymeric or cellulose thickening agent such as polyethylene oxide, polyvinyl alcohol, and the like may be added to increase the viscosity of the dispersion.

Examples of commercially available products that can be used as the dispersion include titanium oxide pastes SP100 and SP200 (both manufactured by Showa Denko K. K.), titanium dioxide fine particle Ti-Nanoxide T (manufactured by Solaronix S. A.), Ti-Nanoxide D (manufactured by Solaronix S. A.), Ti-Nanoxide T/SP (manufactured by Solaronix S. A.), Ti-Nanoxide D/SP (manufactured by Solaronix S. A.), titania coating paste PECC01 (manufactured by Peccell Technologies), titania particle pastes PST-18NR and PST-400C (both manufactured by Nikki Chemical Co., Ltd.), and the like.

A conventional wet film forming method, for example, can be used as the method for applying the dispersion on the transparent conductive film.

Specific examples of the wet film forming method include screen printing methods, ink jet printing methods, roll coating methods, doctor blade methods, spin coating methods, spraying methods, and the like.

Additionally, after applying the dispersion on the transparent conductive film, a heat treatment, chemical treatment, plasma, or ozone treatment is preferably performed in order to enhance electric contact between the particles, enhance adhesion with the transparent conductive film, and enhance film strength.

A temperature of the heat treatment is preferably from 40° C. to 700° C. and more preferably from 40° C. to 650° C. Additionally, a duration of the heat treatment is not particularly limited, but is normally from about 10 seconds to 24 hours.

Specific examples of the chemical treatment include chemical plating using a titanium tetrachloride aqueous solution, chemisorption using a carboxylic acid derivative, electrochemical plating using a titanium trichloride aqueous solution, and the like.

<Counterelectrode>

As illustrated in FIG. 1, the counterelectrode is an electrode 5, disposed opposite a photoelectrode 4. For example, a metal plate, or a glass plate or a resin plate having an electrically conductive film on a surface thereof, can be used.

Examples of metals that can be used as the metal plate include platinum, gold, silver, copper, aluminum, indium, titanium, and the like. Examples of resin plates that can be used include, in addition to the plate (film) exemplified by the transparent plate 1 that constitutes the photoelectrode 4, common resin plates that are non-transparent or have limited transparency.

In addition, examples of the electrically conductive film provided on the surface include metals such as platinum, gold, silver, copper, aluminum, indium, titanium, magnesium, molybdenum and the like; carbon; electrically conductive metal oxides such as tin oxide; tin oxide doped with antimony or fluorine; zinc oxide; zinc oxide doped with aluminum or gallium; indium oxide doped with tin; and the like. A thickness and a forming method of the electrically conductive film are the same as for the transparent conductive film 2 that constitutes the photoelectrode 4.

In the present invention, an electrode having an electrically conductive polymeric film formed on a plate or an electrically conductive polymeric film electrode can be used as a counterelectrode 5.

Specific examples of the electrically conductive polymer include polythiophene, polypyrrole, polyaniline, and the like.

Examples of a method for forming the electrically conductive polymeric film on the plate include a method in which an electrically conductive polymeric film from a polymeric dispersion is formed on a plate using a conventionally known wet film forming method such as a dipping method or a spin coating method.

Examples of products that can be used as the electrically conductive polymeric dispersion include a polyaniline dispersion described in Japanese Unexamined Patent Application No. 2006-169291, commercially available products such as a polythiophene derivative aqueous dispersion (Baytron P, manufactured by Bayer), Aquasave (manufactured by Mitsubishi Rayon Co., Ltd., polyaniline derivative aqueous solution), and the like.

Additionally, when the plate is the electrically conductive plate, in addition to the method described above, the electrically conductive polymeric film can also be formed on the plate via an electrolysis polymerization method. The electrically conductive polymeric film electrode can use a self-standing film wherein the electrically conductive polymeric film formed on the electrode by the electrolysis polymerization method is peeled from the electrode, or a self-standing film formed using a casting method, a spin coating method, or the like that is conventionally known as a wet film forming method for forming a film from an electrically conductive polymeric dispersion. Here, for convenience, a mixture of a state in which electrically conductive polymeric particles are dispersed throughout the solvent and a state in which electrically conductive polymers are dissolved in the solvent is referred to as the "electrically conductive polymeric dispersion."

<Electrolyte Layer>

As illustrated in FIG. 1, the electrolyte layer is an electrolyte layer 6 that is provided between the photoelectrode 4 and the counterelectrode 5. The electrolyte of the present invention described above is used in the photoelectric conversion element of the present invention.

The photoelectric conversion element of the present invention can achieve superior moisture resistance because the electrolyte of the present invention described above is used.

The dye-sensitized solar cell of the present invention is a type of photoelectric conversion element wherein the photoelectrode constituting the photoelectric conversion element of the present invention described above carries a photosensitized dye.

Here, the photosensitized dye is not particularly limited so long as it is a dye having absorption in the visible light spectrum and/or infrared light spectrum, and a metal complex or an organic dye, or the like, can be used.

Examples of the metal complex include ruthenium complex dyes (see the following formula), iron complex dyes, osmium complex dyes, platinum complex dyes, iridium complex dyes, metal phthalocyanine, metal porphyrin, and the like on which a ligand having a bipyridine structure, a terpyridine structure, or the like is coordinated.

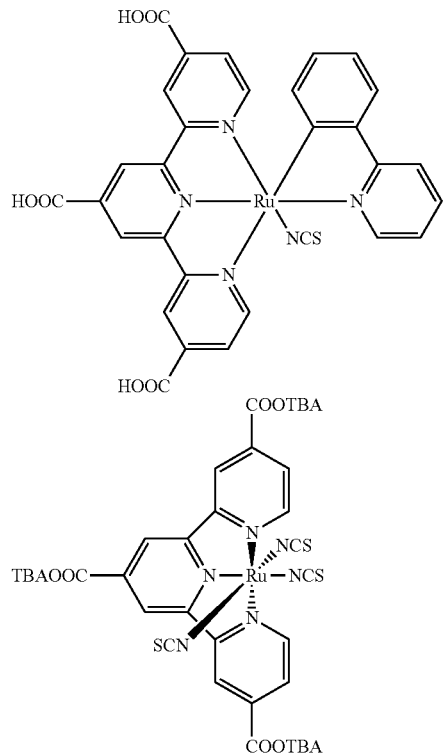

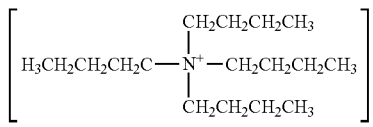

TBA (tetrabuthyl ammonium) =

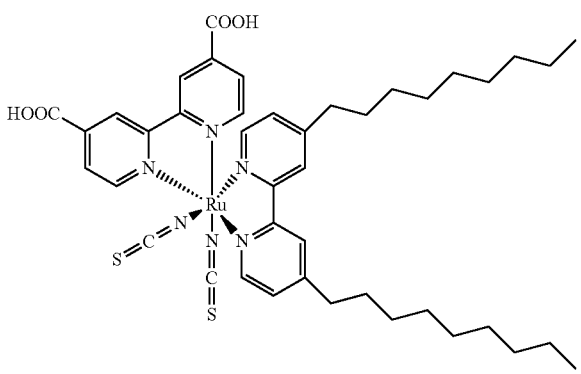

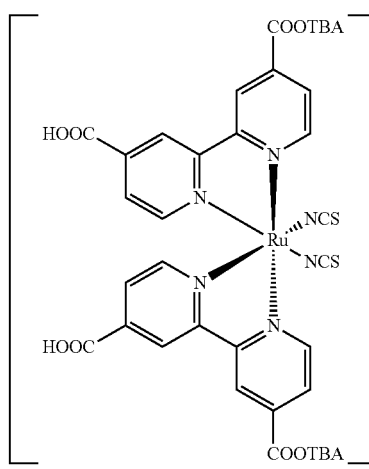

TBA (tetrabuthyl ammonium) =

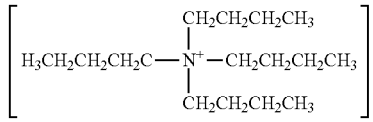

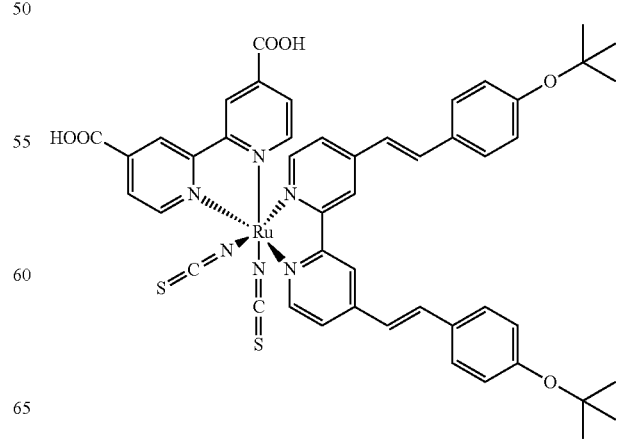

-continued

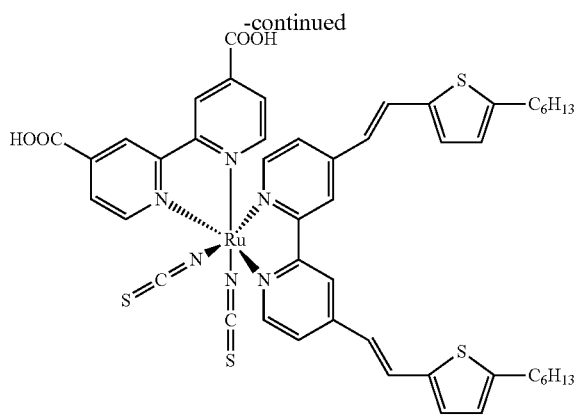

On the other hand, examples of the organic dye include porphyrin-based dyes, phthalocyanine-based dyes, cyanine-based dyes, melocyanine-based dyes, xanthene-based dyes, coumarin-based dyes, indole-based dyes, fluorene-based dyes, triphenylamine-based dyes, and the like.

A method for applying the photosensitized dye is not particularly limited and can be applied by dissolving the dye described above in, for example, water, an alcohol-based solvent, or a nitrile-based solvent, and then immersing the oxide semiconductor porous film 3 in the dye solution or coating the dye solution on the oxide semiconductor porous film 3.

EXAMPLES

The present invention is described below in detail using working examples but is in no way limited to these examples.

Working Examples 1 to 44, Comparative Examples 1 to 12

Preparation of Electrolyte

The components shown in Tables 1 and 2 below (hereinafter abbreviated to "Table 1, etc."), were stirred and mixed in a mixing container according to the compositional ratios (parts by mass) shown in Table 1, etc. so as to prepare an electrolyte.

Specifically, at the compositional ratios shown in Table 1, etc., the lamellar clay mineral shown in Table 1, etc. was added under stirring to the mixed organic salt compound liquid shown in Table 1, etc. so as to swell the lamellar clay mineral and obtained a dispersed gel-like substance (organic salt compound/clay composite material).

Next, the iodine and N-methylbenzimidazole shown in Table 1, etc. were added to, and blended with, the obtained composite material at the compositional ratios shown in Table 1, etc.

Moreover, in cases where an organic solvent shown in Table 1, etc. was used, the iodine and N-methylbenzimidazole were blended with the above-mentioned gel-like substance, and the organic solvent was then added and blended.

<Cation Basis (a1/A)>

In the working examples and comparative examples, the ratio of the cation mass of organic salt compounds 1 and 2 (corresponding to the above-mentioned organic salt compound (a1)) to the total cation mass of organic salt compounds 1 to 4 (corresponding to the above-mentioned organic salt compound (A)) was determined as the "cation basis (a1/A)" (mass %). The cation mass in each organic salt compound was calculated from the ratio of the molecular weight of the imidazolium cation to the molecular weight of the organic salt compound.

<Fabrication of the Dye-Sensitized Solar Cell (Photosensitized Dye: Ruthenium Complex Dye)>

A titanium oxide paste (Ti-Nanoxide D, manufactured by Solaronix S. A.) was coated on transparent electrically conductive glass (FTO glass, surface resistance: 15 Ω/square, manufactured by Nippon Sheet Glass Co., Ltd.) and dried at room temperature, and thereafter was sintered for 30 minutes at a temperature of 450° C. Thereby, a photoelectrode having a titanium oxide porous film formed on transparent electrically conductive glass was fabricated.

The fabricated photoelectrode was then immersed for four hours in a ruthenium complex dye (cis-(diisothiocyanate)-N,N'-bis(2,2'-bipyridyl-4,4'-dicarboxylic acid)ruthenium(II) complex) (Ruthenium 535-bis TBA, manufactured by Solaronix S. A.) butyl alcohol/acetonitrile solution (Volume ratio: 1/1; Concentration: $3 \times 10^{-4}$ mol/L).

Thereafter, the product was washed using acetonitrile and dried in a dark location under a stream of nitrogen. Thus a photoelectrode carrying a photosensitized dye in a titanium oxide electrode of a photoelectrode was used as the photoelectrode.

The prepared electrolyte was applied on the photoelectrode carrying the photosensitized dye, and this and a platinum counterelectrode formed by forming a platinum film having a thickness of about 100 nm on a surface of a transparent electrically conductive glass plate using a sputtering method (indium oxide doped with tin on an electrically conductive face, sheet resistance: 8 Ω/square, manufactured by Nippon Sheet Glass Co., Ltd.) were bonded. When bonding, a thermal fusion bonding film was interposed between the photoelectrode and the platinum counterelectrode. Thermal fusion bonding was performed at 150° C. and a seal was formed between the electrodes. Thus, the dye-sensitized solar cell (photosensitized dye: ruthenium complex dye) was obtained.

<Fabrication of the Dye-Sensitized Solar Cell (Photosensitized Dye: Organic Dye)>

Other than using an indoline-based dye (D149, manufactured by Mitsubishi Paper Mills Limited) in place of the ruthenium complex dye, a dye-sensitized solar cell (photosensitized dye: organic dye) was fabricated according to the same method used in the fabrication of the dye-sensitized solar cell (photosensitized dye: ruthenium complex dye).

<Evaluation>

The photoelectric conversion efficiency of the two obtained types of dye-sensitized solar cells and the maintenance factor thereof were measured and evaluated according to the methods described below. The results are shown in Table 1, etc.

<Photoelectric Conversion Efficiency>

Figure 2:
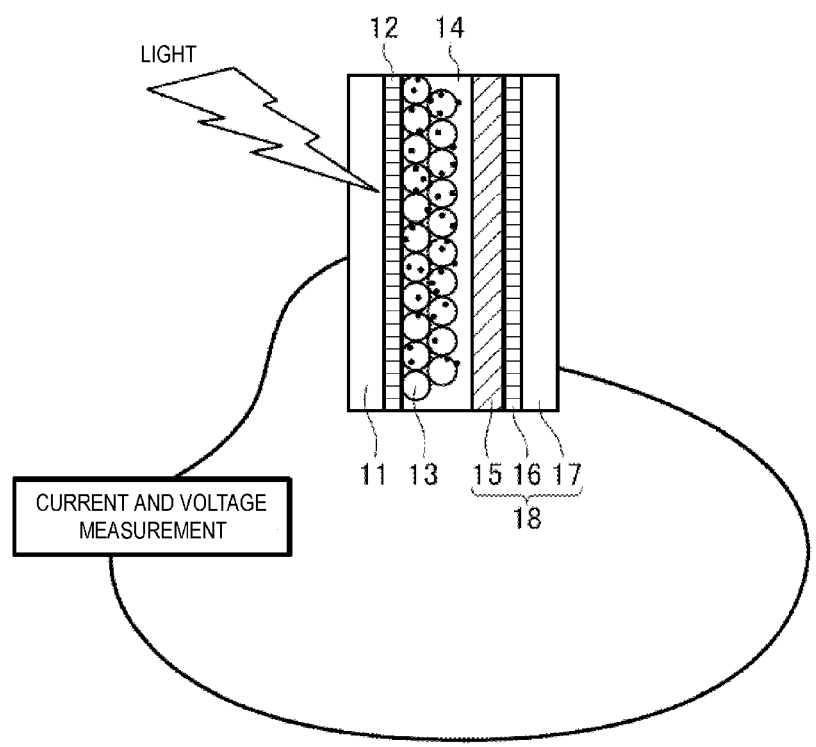

As illustrated in FIG. 2, a solar simulator is used as a light source, the photoelectrode side was irradiated with AM 1.5 artificial sunlight at a light intensity of 100 mW/cm², and the conversion efficiency (%) was calculated using a current-voltage measuring device (Digital Source Meter 2400, manufactured by Keithley Instruments Inc.).

<Moisture Resistance (Maintenance Factor)>

The dye-sensitized solar cell that was measured for photoelectric conversion efficiency was left for 1,000 hours at a temperature of 40° C. and an RH of 85% and was then measured again for photoelectric conversion efficiency according to the same method described above. The maintenance factor (post-humidifying photoelectric conversion efficiency/pre-humidifying photoelectric conversion efficiency×100)[%] was calculated.

When the calculated results of the maintenance factor of photoelectric conversion efficiency was 80% or greater, the moisture resistance was evaluated as being superior.

The same evaluation was performed after allowing the dye-sensitized solar cell to be left for 1,500 hours.

<Moist Heat Resistance (Maintenance Factor)>

The dye-sensitized solar cell that was measured for photoelectric conversion efficiency was left for 1000 hours at a temperature of 85° C. and an RH of 85% and was then measured again for photoelectric conversion efficiency according to the same method described above. The maintenance factor (post-humidifying photoelectric conversion efficiency/pre-humidifying photoelectric conversion efficiency× 100)[%] was calculated.

If the maintenance factor of photoelectric conversion efficiency was 80% or greater, the moist heat resistance was evaluated as being excellent.

The same evaluation was performed after allowing the dye-sensitized solar cell to be left for 1,500 hours.

TABLE 1-1

Photosensitized dye: ruthenium complex dye

| | | | Working Examples | | | | | | |
|---|---|---|---|---|---|---|---|---|---|
| | | | 1 | 2 | 3 | 4 | 5 | 6 | 7 |
| (A) | (a1) | Organic salt compound 1 (MHexImI) | 49.1 | 64.0 | 71.2 | 76.4 | 87.4 | 94.0 | 63.6 |
| | | Organic salt compound 2 (MOctImI) | | | | | | | |
| | (a2) | Organic salt compound 3 (MPImI) | 28.1 | 13.7 | 6.8 | 7.3 | | | 36.4 |
| | | Organic salt compound 4 (EMImSCN) | 22.8 | 22.3 | 22.0 | 16.3 | 12.6 | 6.0 | |
| (B) | | Lamellar clay mineral 1 | 43 | 43 | 43 | 43 | 43 | 43 | 43 |
| | | (indicated as inorganic substance) | (15) | (15) | (15) | (15) | (15) | (15) | (15) |
| Iodine | | | 3.7 | 3.8 | 3.8 | 3.7 | 3.7 | 3.6 | 3.5 |
| N-methylbenzimidazole | | | 4.9 | 4.9 | 4.9 | 4.9 | 4.8 | 4.7 | 4.5 |
| Cation basis (a1/A) (mass %) | | | 50.8 | 64.4 | 70.8 | 76.4 | 86.5 | 93.5 | 68.1 |
| Photoelectric conversion efficiency | | | 6.9 | 6.8 | 6.7 | 6.7 | 6.5 | 6.5 | 6.7 |
| 1000 hours | Moisture resistance (maintenance factor) (%) | | 85 | 86 | 86 | 86 | 86 | 86 | 86 |
| | Moist heat resistance (maintenance factor) (%) | | 83 | 84 | 84 | 83 | 82 | 75 | 73 |
| 1500 hours | Moisture resistance (maintenance factor) (%) | | 83 | 83 | 83 | 83 | 83 | 83 | 83 |
| | Moist heat resistance (maintenance factor) (%) | | 80 | 81 | 81 | 81 | 81 | 68 | 64 |

TABLE 1-2

Photosensitized dye: ruthenium complex dye

| | | | Working Examples | | | | | | | | | | |
|---|---|---|---|---|---|---|---|---|---|---|---|---|---|
| | | | 8 | 9 | 10 | 11 | 12 | 13 | 14 | 15 | 16 | 17 | 18 |
| (A) | (a1) | Organic salt compound 1 (MHexImI) | | | | | | | | | | | |
| | | Organic salt compound 2 (MOctImI) | 50.2 | 58.9 | 73.1 | 78.0 | 86.8 | 94.5 | 65.7 | 50.2 | 50.2 | 73.1 | 50.2 |
| | (a2) | Organic salt compound 3 (MPImI) | 26.2 | 19.7 | 6.3 | 6.8 | | | 34.3 | 26.2 | 26.2 | 6.3 | 26.2 |
| | | Organic salt compound 4 (EMImSCN) | 23.6 | 21.4 | 20.6 | 15.2 | 13.2 | 5.5 | | 23.6 | 23.6 | 20.6 | 23.6 |
| (B) | | Lamellar clay mineral 1 | 43 | 43 | 43 | 43 | 43 | 43 | 43 | 29 | | | |
| | | (indicated as inorganic substance) | (15) | (15) | (15) | (15) | (15) | (15) | (15) | (10) | | | |
| | | Lamellar clay mineral 2 | | | | | | | | | | 43 | 29 |
| | | (indicated as inorganic substance) | | | | | | | | | | (15) | (10) |
| | | Lamellar clay mineral 3 | | | | | | | | 14 | 43 | | 14 |
| | | (indicated as inorganic substance) | | | | | | | | (5) | (15) | | (5) |
| Iodine | | | 3.9 | 3.9 | 3.9 | 3.9 | 3.9 | 3.8 | 3.6 | 3.6 | 3.6 | 3.9 | 3.6 |
| N-methylbenzimidazole | | | 5.0 | 5.0 | 5.1 | 5.1 | 5.1 | 5.0 | 4.7 | 4.7 | 4.7 | 5.1 | 4.7 |
| Cation basis (a1/A) (mass %) | | | 51.6 | 60.0 | 72.6 | 78.0 | 85.8 | 94.1 | 70.1 | 51.6 | 51.6 | 72.6 | 51.6 |
| Photoelectric conversion efficiency | | | 6.8 | 6.8 | 6.7 | 6.7 | 6.5 | 6.5 | 6.7 | 6.9 | 6.8 | 6.6 | 6.7 |
| 1000 hours | Moisture resistance (maintenance factor) (%) | | 86 | 86 | 86 | 86 | 86 | 86 | 86 | 87 | 87 | 86 | 87 |
| | Moist heat resistance (maintenance factor) (%) | | 83 | 84 | 84 | 83 | 83 | 77 | 75 | 84 | 85 | 84 | 84 |
| 1500 hours | Moisture resistance (maintenance factor) (%) | | 84 | 84 | 84 | 84 | 84 | 84 | 84 | 84 | 84 | 84 | 84 |
| | Moist heat resistance (maintenance factor) (%) | | 80 | 80 | 81 | 81 | 81 | 72 | 68 | 83 | 83 | 81 | 83 |

TABLE 1-3

Photosensitized dye: ruthenium complex dye

|  |  |  | Working Examples | | | | | |
|---|---|---|---|---|---|---|---|---|
|  |  |  | 19 | 20 | 21 | 22 | 23 | 24 |
| (A) | (a1) | Organic salt compound 1 (MHexImI) |  |  |  |  |  |  |
|  |  | Organic salt compound 2 (MOctImI) | 69.5 | 65.8 | 58.5 | 58.5 | 65.8 | 58.5 |
|  | (a2) | Organic salt compound 3 (MPImI) | 6.0 | 5.7 | 5.0 | 5.0 | 5.7 | 5.0 |
|  |  | Organic salt compound 4 (EMImSCN) | 19.5 | 18.5 | 16.5 | 16.5 | 18.5 | 16.5 |
| (B) |  | Lamellar clay mineral 1 | 43 | 43 | 43 | 29 |  |  |
|  |  | (indicated as inorganic substance) | (15) | (15) | (15) | (10) |  |  |
|  |  | Lamellar clay mineral 2 |  |  |  |  | 43 | 29 |
|  |  | (indicated as inorganic substance) |  |  |  |  | (15) | (10) |
|  |  | Lamellar clay mineral 3 |  |  |  | 14 |  | 14 |
|  |  | (indicated as inorganic substance) |  |  |  | (5) |  | (5) |
| (C) |  | Organic solvent 1 | 5.0 | 10.0 | 20.0 | 20.0 | 10.0 | 20.0 |
| Iodine |  |  | 3.9 | 3.9 | 3.6 | 3.6 | 3.9 | 3.6 |
| N-methylbenzimidazole |  |  | 5.0 | 5.0 | 4.7 | 4.7 | 5.0 | 4.7 |
| Cation basis (a1/A) (mass %) |  |  | 72.6 | 72.6 | 72.6 | 72.6 | 72.6 | 72.6 |
| Photoelectric conversion efficiency |  |  | 7.2 | 7.4 | 7.6 | 7.5 | 7.3 | 7.4 |
| 1000 hours | Moisture resistance (maintenance factor) (%) |  | 86 | 86 | 85 | 85 | 86 | 85 |
|  | Moist heat resistance (maintenance factor) (%) |  | 83 | 82 | 82 | 84 | 82 | 84 |
| 1500 hours | Moisture resistance (maintenance factor) (%) |  | 84 | 84 | 83 | 84 | 84 | 84 |
|  | Moist heat resistance (maintenance factor) (%) |  | 81 | 80 | 80 | 82 | 80 | 82 |

TABLE 1-4

Photosensitized dye: ruthenium complex dye

|  |  |  | Comparative Example | | | | | |
|---|---|---|---|---|---|---|---|---|
|  |  |  | 1 | 2 | 3 | 4 | 5 | 6 |
| (A) | (a1) | Organic salt compound 1 (MHexImI) |  | 49.1 |  | 33.5 |  |  |
|  |  | Organic salt compound 2 (MOctImI) |  |  | 50.2 |  | 35.6 | 58.5 |
|  | (a2) | Organic salt compound 3 (MPImI) | 75.5 | 28.1 | 26.2 | 43.1 | 41.8 | 5.0 |
|  |  | Organic salt compound 4 (EMImSCN) | 24.5 | 22.8 | 23.6 | 23.3 | 22.6 | 16.5 |
| (B) |  | Lamellar clay mineral 1 | 43 |  |  | 43 | 43 |  |
|  |  | (indicated as inorganic substance) | (15) |  |  | (15) | (15) |  |
| (C) |  | Organic solvent 1 |  |  |  |  |  | 20.0 |
| Iodine |  |  | 3.6 | 3.7 | 3.9 | 3.7 | 3.8 | 3.8 |
| N-methylbenzimidazole |  |  | 4.7 | 4.9 | 5.0 | 4.8 | 4.9 | 4.9 |
| Cation basis (a1/A) (mass %) |  |  | 0.0 | 50.8 | 51.6 | 35.6 | 37.8 | 72.6 |
| Photoelectric conversion efficiency |  |  | 7.1 | 6.8 | 6.8 | 7.0 | 7.0 | 7.6 |
| 1000 hours | Moisture resistance (maintenance factor) (%) |  | 68 | 68 | 69 | 75 | 76 | 67 |
|  | Moist heat resistance (maintenance factor) (%) |  | 61 | 62 | 63 | 68 | 70 | 58 |
| 1500 hours | Moisture resistance (maintenance factor) (%) |  | 65 | 63 | 63 | 72 | 72 | 62 |
|  | Moist heat resistance (maintenance factor) (%) |  | 57 | 55 | 55 | 64 | 66 | 55 |

TABLE 2-1

Photosensitized dye: organic dye

|  |  |  | Working Examples | | | | |
|---|---|---|---|---|---|---|---|
|  |  |  | 25 | 26 | 27 | 28 | 29 |
| (A) | (a1) | Organic salt compound 1 (MHexImI) | 49.1 | 76.4 | 87.4 | 94.0 | 63.6 |
|  |  | Organic salt compound 2 (MOctImI) |  |  |  |  |  |
|  | (a2) | Organic salt compound 3 (MPImI) | 28.1 | 7.3 |  |  | 36.4 |
|  |  | Organic salt compound 4 (EMImSCN) | 22.8 | 16.3 | 12.6 | 6.0 |  |
| (B) |  | Lamellar clay mineral 1 | 43 | 43 | 43 | 43 | 43 |
|  |  | (indicated as inorganic substance) | (15) | (15) | (15) | (15) | (15) |
| Iodine |  |  | 3.7 | 3.7 | 3.7 | 3.6 | 3.5 |
| N-methylbenzimidazole |  |  | 4.9 | 4.9 | 4.8 | 4.7 | 4.5 |
| Cation basis (a1/A) (mass %) |  |  | 50.8 | 76.4 | 86.5 | 93.5 | 68.1 |
| Photoelectric conversion efficiency |  |  | 6.1 | 6.1 | 6.0 | 5.9 | 6.1 |
| 1000 hours | Moisture resistance (maintenance factor) (%) |  | 85 | 86 | 86 | 86 | 85 |
|  | Moist heat resistance (maintenance factor) (%) |  | 83 | 83 | 83 | 84 | 82 |
| 1500 hours | Moisture resistance (maintenance factor) (%) |  | 83 | 83 | 83 | 83 | 83 |
|  | Moist heat resistance (maintenance factor) (%) |  | 80 | 80 | 81 | 82 | 80 |

TABLE 2-2

Photosensitized dye: organic dye

| | | | Working Examples | | | | | | | | |
|---|---|---|---|---|---|---|---|---|---|---|---|
| | | | 30 | 31 | 32 | 33 | 34 | 35 | 36 | 37 | 38 |
| (A) | (a1) | Organic salt compound 1 (MHexImI) | | | | | | | | | |
| | | Organic salt compound 2 (MOctImI) | 50.2 | 73.1 | 86.8 | 94.5 | 65.7 | 50.2 | 50.2 | 73.1 | 50.2 |
| | (a2) | Organic salt compound 3 (MPImI) | 26.2 | 6.3 | | | 34.3 | 26.2 | 26.2 | 6.3 | 26.2 |
| | | Organic salt compound 4 (EMImSCN) | 23.6 | 20.6 | 13.2 | 5.5 | | 23.6 | 23.6 | 20.6 | 23.6 |
| (B) | | Lamellar clay mineral 1 | 43 | 43 | 43 | 43 | 43 | 29 | | | |
| | | (indicated as inorganic substance) | (15) | (15) | (15) | (15) | (15) | (10) | | | |
| | | Lamellar clay mineral 2 | | | | | | | | 43 | 29 |
| | | (indicated as inorganic substance) | | | | | | | | (15) | (10) |
| | | Lamellar clay mineral 3 | | | | | | 14 | 43 | | 14 |
| | | (indicated as inorganic substance) | | | | | | (5) | (15) | | (5) |
| Iodine | | | 3.9 | 3.9 | 3.9 | 3.8 | 3.6 | 3.6 | 3.6 | 3.9 | 3.6 |
| N-methylbenzimidazole | | | 5.0 | 5.1 | 5.1 | 5.0 | 4.7 | 4.7 | 4.7 | 5.1 | 4.7 |
| Cation basis (a1/A) (mass %) | | | 51.6 | 72.6 | 85.8 | 94.1 | 70.1 | 51.6 | 51.6 | 72.6 | 51.6 |
| Photoelectric conversion efficiency | | | 6.1 | 6.1 | 6.0 | 5.9 | 6.1 | 6.1 | 6.0 | 6.0 | 6.0 |
| 1000 hours | Moisture resistance (maintenance factor) (%) | | 86 | 86 | 86 | 86 | 86 | 86 | 86 | 86 | 86 |
| | Moist heat resistance (maintenance factor) (%) | | 83 | 83 | 83 | 83 | 83 | 84 | 85 | 83 | 84 |
| 1500 hours | Moisture resistance (maintenance factor) (%) | | 84 | 84 | 84 | 84 | 84 | 84 | 84 | 84 | 84 |
| | Moist heat resistance (maintenance factor) (%) | | 80 | 81 | 81 | 82 | 81 | 83 | 83 | 81 | 83 |

TABLE 2-3

Photosensitized dye: organic dye

| | | | Working Examples | | | | | |
|---|---|---|---|---|---|---|---|---|
| | | | 39 | 40 | 41 | 42 | 43 | 44 |
| (A) | (a1) | Organic salt compound 1 (MHexImI) | | | | | | |
| | | Organic salt compound 2 (MOctImI) | 58.5 | 58.5 | 58.5 | 58.5 | 58.5 | 58.5 |
| | (a2) | Organic salt compound 3 (MPImI) | 5.0 | 5.0 | 5.0 | 5.0 | 5.0 | 5.0 |
| | | Organic salt compound 4 (EMImSCN) | 16.5 | 16.5 | 16.5 | 16.5 | 16.5 | 16.5 |
| (B) | | Lamellar clay mineral 1 | 43 | 43 | 43 | 29 | | |
| | | (indicated as inorganic substance) | (15) | (15) | (15) | (10) | | |
| | | Lamellar clay mineral 2 | | | | | 43 | 29 |
| | | (indicated as inorganic substance) | | | | | (15) | (10) |
| | | Lamellar clay mineral 3 | | | | 14 | | 14 |
| | | (indicated as inorganic substance) | | | | (5) | | (5) |
| (C) | | Organic solvent 1 | 5.0 | 10.0 | 20.0 | 20.0 | 5.0 | 20.0 |
| Iodine | | | 3.9 | 3.9 | 3.6 | 3.6 | 3.9 | 3.6 |
| N-methylbenzimidazole | | | 5.0 | 5.0 | 4.7 | 4.7 | 5.0 | 4.7 |
| Cation basis (a1/A) (mass %) | | | 72.6 | 72.6 | 72.6 | 72.6 | 72.6 | 72.6 |
| Photoelectric conversion efficiency | | | 6.2 | 6.3 | 6.5 | 6.5 | 6.1 | 6.4 |
| 1000 hours | Moisture resistance (maintenance factor) (%) | | 86 | 86 | 85 | 85 | 86 | 85 |
| | Moist heat resistance (maintenance factor) (%) | | 82 | 82 | 82 | 84 | 82 | 84 |
| 1500 hours | Moisture resistance (maintenance factor) (%) | | 84 | 84 | 83 | 84 | 84 | 84 |
| | Moist heat resistance (maintenance factor) (%) | | 81 | 80 | 80 | 82 | 81 | 82 |

TABLE 2-4

Photosensitized dye: organic dye

| | | | Comparative Example | | | | | |
|---|---|---|---|---|---|---|---|---|
| | | | 7 | 8 | 9 | 10 | 11 | 12 |
| (A) | (a1) | Organic salt compound 1 (MHexImI) | | 49.1 | | 33.5 | | |
| | | Organic salt compound 2 (MOctImI) | | | 50.2 | | 35.6 | 58.5 |
| | (a2) | Organic salt compound 3 (MPImI) | 75.5 | 28.1 | 26.2 | 43.1 | 41.8 | 5.0 |
| | | Organic salt compound 4 (EMImSCN) | 24.5 | 22.8 | 23.6 | 23.3 | 22.6 | 16.5 |
| (B) | | Lamellar clay mineral 1 | 43 | | | 43 | 43 | |
| | | (indicated as inorganic substance) | (15) | | | (15) | (15) | |
| (C) | | Organic solvent 1 | | | | | | 20.0 |
| Iodine | | | 3.6 | 3.7 | 3.9 | 3.7 | 3.8 | 3.6 |
| N-methylbenzimidazole | | | 4.7 | 4.9 | 5.0 | 4.8 | 4.9 | 4.7 |
| Cation basis (a1/A) (mass %) | | | 0.0 | 50.8 | 51.6 | 35.6 | 37.8 | 72.6 |
| Photoelectric conversion efficiency | | | 6.0 | 6.1 | 6.1 | 6.0 | 6.0 | 6.3 |
| 1000 hours | Moisture resistance (maintenance factor) (%) | | 68 | 68 | 69 | 75 | 76 | 67 |
| | Moist heat resistance (maintenance factor) (%) | | 57 | 62 | 63 | 63 | 65 | 58 |

TABLE 2-4-continued

| | Photosensitized dye: organic dye | | | | | | |
|---|---|---|---|---|---|---|---|
| | | Comparative Example | | | | | |
| | | 7 | 8 | 9 | 10 | 11 | 12 |
| 1500 hours | Moisture resistance (maintenance factor) (%) | 65 | 63 | 63 | 72 | 72 | 62 |
| | Moist heat resistance (maintenance factor) (%) | 53 | 55 | 55 | 59 | 60 | 55 |

The components shown in Table 1, etc. are as follows.

Organic salt compound 1 (MHexImI): 1-methyl-3-hexyl imidazolium iodide (specific gravity: 1.416 g/cm$^3$, manufactured by Merck)

Organic salt compound 2 (MOctImI): 1-methyl-3-octyl imidazolium iodide (specific gravity: 1.335 g/cm$^3$, manufactured by Merck)

Organic salt compound 3 (MPImI): 1-methyl-3-propyl imidazolium iodide (specific gravity: 1.536 g/cm$^3$, manufactured by Tokyo Chemical Industry Co., Ltd.)

Organic salt compound 4 (EMImSCN): 1-ethyl-3-methyl imidazolium thiocyanate (specific gravity: 1.115 g/cm$^3$, manufactured by Merck)

Lamellar clay mineral 1: Synthetic smectite (trade name: Lucentite SPN, manufactured by Co-op Chemical Co., Ltd. (organically modified lamellar clay mineral of organically modified Lucentite SWN (average particle size: 0.02 to 0.05 μm, also manufactured by Co-op Chemical Co., Ltd.)))

Lamellar clay mineral 2: Synthetic mica (trade name: Somasif MPE (organically modified lamellar clay mineral obtained by organically treating Somasif Me. (average particle diameter: 5 to 7 μm, manufactured by Co-op Chemical Co., Ltd.), manufactured by Co-op Chemical Co., Ltd.)

Lamellar clay mineral 3: Silane-treated organic bentonite treated with quaternary ammonium and alkyltrialkoxysilane (manufactured by Hojun Co., Ltd.)

Organic solvent 1: Methoxypropionitrile (boiling point: 166° C., relative dielectric constant: 25)

As is clear from the results shown in Table 1, etc., Working Examples 1 to 44 all exhibited excellent moisture resistance. In particular, it was understood that Working Examples 15, 16, 18, 22 and 24, which contain lamellar clay mineral 3, which has an alkylsilyl group, and Working Examples 35, 36, 38, 42 and 44 exhibited excellent moist heat resistance even after being left for 1,500 hours.

In addition, it was understood that Working Examples 1 to 5, which contain 10 mass % or more of organic salt compound 4 relative to the total mass of the organic salt compound, exhibited superior moist heat resistance to Working Examples 6 and 7, in which this content is 10 mass %. This was the same when comparing Working Examples 8 to 12 with Working Examples 13 and 14. Moreover, it was understood from a comparison of Working Examples 25 to 27 and Working Examples 28 and 29 and a comparison of Working Examples 30 to 32 and Working Examples 33 and 34 that dye-sensitized solar cells containing organic dyes as photosensitized dyes exhibit excellent moist heat resistance regardless of the presence of organic salt compound 4.

In addition, it was understood that Working Examples 19 to 22, which contain organic solvent 1, and Working Examples 39 to 42 maintain excellent moisture resistance and exhibit high photoelectric conversion efficiency compared to those working examples that do not contain organic solvent 1.

In addition, it was understood that among Working Examples 1 to 6, Working Examples 1 to 4 exhibited superior photoelectric conversion efficiency to Working Examples 5 and 6, and that among Working Examples 8 to 13, Working Examples 8 to 11 exhibited superior photoelectric conversion efficiency to Working Examples 12 and 13.

However, it was understood that Comparative Example 1 and Comparative Example 7, which do not contain organic salt compound 1 or organic salt compound 2, Comparative Examples 2, 3 and 6, which do not contain lamellar clay mineral 1, and Comparative Examples 8, 9 and 12 exhibit poor moisture resistance regardless of the presence of an organic solvent and exhibit poor moist heat resistance even if organic salt compound 4 is present.

In addition, it was understood that Comparative Examples 4 and 5, in which the "cation basis (a1/A)" is 50 mass % or lower, and Comparative Examples 10 and 11 exhibit poor moisture resistance and moist heat resistance.

REFERENCE NUMERALS

1: Transparent plate
2: Transparent conductive film
3: Oxide semiconductor porous film
4: Photoelectrode
5: Counterelectrode
6: Electrolyte layer
11: Transparent plate
12: Transparent conductive film (ITO, FTC))
13: Metal oxide
14: Electrolyte
15: Platinum film
16: Transparent conductive film (ITO, FTC))
17: Plate
18: Counterelectrode

What is claimed is:

1. An electrolyte for a photoelectric conversion element comprising:
   an organic salt compound (A) having a cation represented by formula (1) or (2) below, and a lamellar clay mineral (B), wherein
   the organic salt compound (A) comprises more than 50 mass %, in terms of cationic weight, of an organic salt compound (a1), and
   the organic salt compound (a1) is: a compound in which at least one of $R^2$, $R^3$ and an optional substituent group on $R^1$ in formula (1) below is a hydrocarbon group having from 5 to 20 carbon atoms and optionally having a hetero atom, or a compound in which at least one of $R^4$, $R^5$, $R^6$ and $R^7$ in formula (2) below is a hydrocarbon group having from 5 to 20 carbon atoms and optionally having a hetero atom:

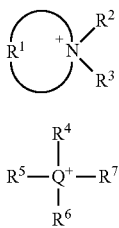 (1)

$$R^5—Q^+—R^7$$ (2)
(with $R^4$ above $Q^+$ and $R^6$ below $Q^+$)

wherein, in formula (1), $R^1$ is a hydrocarbon group having from 1 to 20 carbon atoms and optionally having a hetero atom, and may include a substituent having from 1 to 20 carbon atoms and optionally having a hetero atom; $R^2$ and $R^3$ are each independently a hydrogen atom or a hydrocarbon group having from 1 to 20 carbon atoms and optionally having a hetero atom; however, the $R^3$ moiety is absent if the nitrogen atom contains a double bond;

in formula (2), Q is a nitrogen atom, an oxygen atom, a phosphorus atom or a sulfur atom, and $R^4$, $R^5$, $R^6$ and $R^7$ are each independently a hydrogen atom or a hydrocarbon group having from 1 to 20 carbon atoms and optionally having a hetero atom; however, the $R^7$ moiety is absent if Q is an oxygen atom or a sulfur atom and, if Q is a sulfur atom, $R^4$ and $R^5$ may be linked, and the organic salt compound (A) comprises less than or equal to 50 mass % in terms of cationic weight, of an organic salt compound (a2), and the organic salt compound (a2) is a compound in which the hydrocarbon groups represented by $R^2$ and $R^3$ in formula (1) above are hydrocarbon groups having from 1 to 4 carbon atoms and optionally having a hetero atom, or a compound in which the hydrocarbon groups represented by $R^4$, $R^5$, $R^6$ and $R^7$ in formula (2) above are hydrocarbon groups having from 1 to 4 carbon atoms and optionally having a hetero atom;

and either or both of the organic salt compound (a1) and organic salt compound (a2) has a thiocyanate anion.

2. The electrolyte for a photoelectric conversion element according to claim 1, wherein a content of the organic salt compound (a1) in the organic salt compound (A) is 90 mass % or less in terms of cationic weight.

3. The electrolyte for a photoelectric conversion element according to claim 1, wherein the lamellar clay mineral (B) comprises an alkylsilyl group.

4. The electrolyte for a photoelectric conversion element according to claim 1, further comprising an organic solvent (C) having a boiling point of 150° C. or higher and a relative dielectric constant of 20 or higher.

5. The electrolyte for a photoelectric conversion element according to claim 2, wherein the lamellar clay mineral (B) comprises an alkylsilyl group.

6. The electrolyte for a photoelectric conversion element according to claim 3, further comprising an organic solvent (C) having a boiling point of 150° C. or higher and a relative dielectric constant of 20 or higher.

* * * * *